(12) United States Patent
Henderson et al.

(10) Patent No.: US 6,327,363 B1
(45) Date of Patent: Dec. 4, 2001

(54) METHOD AND SYSTEM FOR AUTOMATED CUSTOMER SERVICES

(75) Inventors: Karl M. Henderson, Highland Village; David A. Hernandez, Plano; James M. Hoggatt, Garland; Kamran W. Mir, Plano, all of TX (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/198,721

(22) Filed: Nov. 24, 1998

Related U.S. Application Data

(60) Provisional application No. 60/082,169, filed on Apr. 17, 1998.

(51) Int. Cl.[7] .................................................. H04M 3/00
(52) U.S. Cl. ................................ 379/265.01; 379/91.01; 379/93.03
(58) Field of Search ..................... 379/265, 266, 379/309, 91.01, 93.03, 113, 114

(56) References Cited

U.S. PATENT DOCUMENTS 5,987,118 * 11/1999 Dickerman et al. .......... 379/93.03 X
6,160,874 * 12/2000 Dickerman et al. .......... 379/91.01 X

* cited by examiner

Primary Examiner—Creighton Smith

(57) ABSTRACT

A system and method for accepting customer calls for product related services and directing these calls to an appropriate customer service center. The system contains a customer service network and a customer transaction database for storing a plurality of product information and vendor/customer data. A transaction processor is arranged to process calls received through the network and to route the calls to an appropriate care center for a particular customer in accordance with data associated with a customer-entered personal identification number provided to the customer at the time of purchase. The services are provided on the basis of a pre-paid account, which is debited after a service agent answers the customer call based on signaling generated at the call center.

48 Claims, 27 Drawing Sheets

| Data Element Name | Description |
|---|---|
| \multicolumn{2}{Key Elements} | |
| access_num | toll free access number of the PrePaid service |
| pin_code | personal identification number of the PrePaid Card |
| track_no | tracking number for PIN |
| \multicolumn{2}{Data Elements} | |
| Activation_date | activation date |
| Activation_duration | number of months of activation (0 is allowed for Default/Fixed or Specified/Fixed cards only) |
| Activation_status_type | • low order byte and low order nibble(loln) = Card Status<br>• low order byte and high order nibble (lohn) = Suspend Reason<br>• high order byte and low order nibble (holn) = Card Type<br>• high order byte and high order nibble (hohn) = First Use/Reset Expiration Date<br><br>Card Status<br>loln = 0, Generated<br>loln = 1, Active<br>loln = 2, Suspended<br>loln = 3, Expired<br><br>Suspend Reason Code<br>lohn = 0, Recharge Fraud<br>lohn = 1, International Fraud<br>lohn = 2, Domestic Fraud<br>lohn = 3, Lost/Stolen<br>lohn = 4, Hot Originating ANI<br>lohn = 5, Hot Terminating ANI<br>lohn = 6, Refund<br>lohn = 7, Maintenance<br><br>Card Type<br>holn = 0, Default<br>holn = 1, Specified<br>holn = 2, Point of Sale PIN<br>holn = 3, Point of Sale Batch<br><br>First Use<br>hohn = 0, Not First Use<br>hohn = 1, First Use |
| Balance | balance for long distance and other services<br>For Time-based SC card, it is in time units,<br>For Incidents-based SC Card, it is in incidents |
| batch_num | batch number for the PIN |
| Recharge_flag | recharge flag:<br>0 - no recharges<br>1 - recharges have been made |
| Expiration_date | deactivation date |

FIG. 13A

| Data Element Name | Description |
|---|---|
| lock_flag | locks account record when in use:<br>0 - unlock<br>1 - lock |
| max_speed_dial | maximum number of speed dial entries |
| service_profile | Service profile (bitmask)<br>Bit - Feature<br>0 - Domestic Termination<br>1 - International Termination<br>2 - International Origination<br>3 - Customer Service<br><br>4 - Operator Assistance<br>5 - Speed Dial Service<br>6 - Single Number Termination<br>7 - Manual Recharge<br><br>8 - Menu Option 5<br>9 - Support Card<br>10 - Refreshable PIN<br>11 - Time of Date Rating<br><br>12 - Flex Unit Rating<br>13 - Travelers Assistance<br>14 - Survey (unused)<br>15 - Information Services<br><br>16 - Conference Calling (unused)<br>17 - Messaging Service (unused)<br>18 - Voice Mail Access (unused)<br>19 - Auto Recharge<br><br>20 - Social Expressions<br>21 - Has Been Played<br>22 - Has Been Used<br>23 - Sub Unit Rating<br><br>24 - Most Favored Nation (MFN)<br>25 - Single Number Termination on First Use (SNTFU)<br>26 - Santa Card<br>27 - Msg Stored<br><br>28 - SVS Mobil Card<br>29 - passcode<br>30 - bonus eligibility flag<br>31 - reserved for expansion |
| lock_time_stamp | Time record is locked |
| credit_counter | Counts the number of times that a credit has been given to a subscriber. This count will be used to detect fraud by preventing a subscriber from repeated requests for card credit. |
| Language | Caller's Language |

FIG. 13B

| Data Element Name | Description |
|---|---|
| special_greeting | Special Greeting |
| dial_out_num | Destination number for Single Out Dial and Technical Support (excludes 500,700,900,976, & 950) |
| ann_group_id | Announcement to play while dialing "dial_out_num" |
| max_call_time | Maximum time limit per call on each tech support call; |
| Language_mask | Available languages bit mask |
| Original_activation | Original activation date |
| Original_expiration | Original expiration date |
| Original_balance | Original balance |
| flex_table_id | Flexible table rate identification, values 0-255 are used to index the rate table:<br>0 = Standard Rating<br>1 = Tariff 7 Rating<br>2 = Generic Sub Unit Rating<br>3 = MoneyGram Sub Unit Rating<br>7 = PAUGO Sub Unit Rating<br>8 = PAUGO Whole Unit Rating<br>9 = 255 reserved<br><br>Values 256-65535 are used as rate method indicators which are not used to index the rate table:<br>256 = Support Card Incident Rating<br>257 = Support Card Whole Unit Rating<br>285 - 65535 reserved |
| Activation_history | Activation History<br>0 - PIN has never been active<br>1 - PIN has been active before |
| unit_price | Unit Price for POS card, based on original purchase price and # of units. |
| mfn_card_type | 1 = Europe<br>2 = Asia<br>3 = South America |
| mfn_country_code | Selected MFN country code |
| mo5_id | Menu option 5 ID |
| sntfu_id | Single number termination ID key |
| Session_id | Session id used to map record to call Activity table |
| Security_code | Security code to allow users to change their passcode |
| Passcode | Passcode value when this feature is selected in the service profile field |
| Total_units_credited | Total number of units credited to this PIN when caller requests for credits due to the platform problems |
| Call_count | Counter to count the number of attempts to access the PIN info in a set amount of time (fraud control). |
| Menu_id | The Menu ID for Support Card |

FIG. 13C

METHOD AND SYSTEM FOR AUTOMATED CUSTOMER SERVICES

CROSS-REFERENCE TO RELATED APPLICATION

The present invention relates to and claims priority from U.S. Provisional Application No. 60/082,169 entitled "METHOD AND SYSTEM FOR CUSTOMER SUPPORT SERVICES", filed on Apr. 17, 1998 and specifically incorporated herein by reference for all that it discloses and teaches.

BACKGROUND OF THE INVENTION

1. Field of the Invention

The present invention relates to a system for providing customer services using a network-based database and more specifically to an application that collects and stores, for example, customer, vendor and product data, accepts service calls from customers, routes the calls to an appropriate customer service center, and triggers a debiting of a customer account.

2. Description of the Related Art

Without limiting the invention, its background is described in connection with customer support services that are rendered after the purchase of a good. Other services, however, are also supportable in accordance with the present invention.

Most makers of distributed goods provide product support services after a product is purchased. Often, a customer is charged a warranty premium, in addition to the purchase price of the good, to obtain support. For many potential customers, post-purchase support are critical to the overall purchasing decision. Thus, an organization's capacity for efficient and effective customer support may impact its bottom line.

In a typical scenario, customer support requires the customer to provide an assortment of information, such as the model number, the product type, the date of purchase, the sales location, and other information pertaining to a particular sales transaction, in order to obtain product support. For example, vendors commonly require a customer to register their product in order to receive customer support (e.g., by way of a mail-in product registration card, a time-consuming phone call to the vendor, or a post-purchase, online registration process). This process requires considerable time and effort on the part of both the customer and the vendor and can lead to customer frustration, limiting the number of customers who actually register their products. As a result, valuable customer and product information is never captured by the vendor, and customer dissatisfaction with the product and or vendor may be increased.

Typically, these customer support services are provided through a toll-free telephone number that enables a customer to reach a customer support agent at a call center. For example, a vendor that sells a software product may provide a 1-800 number with the product for their customers to call in order to obtain support for the software product. When the customer calls the 1-800 number, the call is connected to a technical support agent at a call center. Because many customer's fail to properly register their product purchase with the vendor, the support agent often must verbally collect information from the customer before having sufficient information to provide satisfactory support. This process may further irritate a customer already frustrated by the need for support in the first place. Providing customer support services is also typically a great expense for a vendor. The vendor must cover the cost of the customer support agent's time and the cost of the toll-free call. In addition, considerable time and resources are required to collect and manage current information about the product and the customer. Often, there is no tracking of the time spent serving the customer or of other call characteristics that would be useful in managing the customer support process. It would be advantageous for the vendor limit the amount of free support it provides or to provide customer support on a paid basis. Consequently, improvements in customer support methods and systems can help improve customer relations and reduce the costs of customer service.

Prior art systems and methods for vending and delivering customer service and support depend primarily on having the customer call directly into a product vendor's service call center. The integration of such customer service calls with appropriate service call centers, however, has not been addressed. Moreover, the process of automatically routing customer service calls to an appropriate service center based on product type and model number has been, until the present invention, an unpracticed method of delivering customer support. Ideally, a customer could dial into a toll free customer support network and reach a qualified support specialist who is familiar with the specific product purchased by the customer.

Consequently, need exists for a universal application to maintain an information database used for integration of customer services with the product registration and the delivery of customer support services. Both vendors and customers would derive tremendous benefits from such an application. When purchasing a product, it would be desirable for a customer to acquire a credit/debit card entitling them to obtain a specified amount of product support from the vendor, so that customer, product, and vendor information could be associated with the card at or prior to the actual purchase. Likewise, it would be advantageous for a vendor to manage customer support costs and improve customer service business processes through enhanced information gathering and database capabilities.

BRIEF SUMMARY OF THE PRESENT INVENTION

A system and method in accordance with the present invention permit product and service vendors to control access to call center services through an intelligent network, preferably employing an automated interactive voice response application. The present invention can, for example, be utilized to collect warranty and product registration information, to measure entitlement to support services, and to collect and process customer, product, and vendor information. In one embodiment, the present invention provides a vehicle for vendors (i.e., product and/or service providers) to charge and receive revenue for their support services, which traditionally have been a necessary expense of doing business. Furthermore, the services provided in accordance with the present invention can involve services other than customer support services. Additionally or alternately, other services may be provided within the scope of the present invention, including without limitation news and sports update lines, financial services, and celebrity chat lines.

An advantage of the present invention is that it supports a network-based program that gives a product vendor the opportunity to improve the quantity and efficiency of services related to merchandise purchased by the customer. In this regard, a network-based database provides access to information through applications responsible for maintaining this database. The database provides controlled access to customer service centers and, for example, to help desk environments corresponding to a specific product brand and/or model.

Another advantage of the present invention is an automated interactive voice application for acquiring information from a customer call by using a set of predefined recorded instructions and options from a network-based database, thereby allowing the customer to customize the services received.

Another advantage of the present invention is a customer transaction database for storing a plurality of product, vendor and customer data, where the customer transaction database is communicably linked to a customer service network via a communications link.

Another advantage of the present invention is a service card platform arranged to process calls received through a network and route these calls by determining the appropriate service centers in accordance with data stored in a customer transaction database.

Another advantage of the present invention is logical processing that allows the system to trigger the debiting of a customer's pre-paid account after a service agent answers the phone, rather than when the call is first answered by a call service center's Automated Call Distribution (ACD) application or other switching logic.

Disclosed, in one embodiment, is a system for accepting customer calls for product related services and directing these calls to an appropriate customer service center. The system contains a customer service network and a customer transaction database for storing a product information and vendor/customer data. The customer transaction database can be communicably linked to a customer service network via a communications link. A transaction processor is arranged to process calls received through the network and to determine the appropriate service center for a particular customer from the entry of a personal identification number (PIN) provided to the customer at the time of purchase. The PIN may be used as a key to access data in the customer transaction database.

These and other advantages of the invention are understood by reference to the following detailed description taken in conjunction with the attached drawings.

To achieve the foregoing and other advantages, and in accordance with the purposes of the present invention, as embodied and broadly described herein, the system of this invention may comprise a customer service network; a customer transaction database coupled to the customer service network for storing an account record; a transaction processor coupled to the customer transaction database and configured to process a customer call received through the customer service network and to route the customer call to an appropriate service center in accordance with criteria relating to data recorded in said account record; an agent station located at an appropriate service center and coupled to the transaction processor to receive the customer call; and a triggering signal to trigger a debit in said account record after an answer is detected at said agent station.

The present invention may also comprise, in accordance with its object and purposes, a method having the operations of receiving a call and a customer identification number; using the customer identification number to locate a pre-paid account record in a customer transaction database; routing the call to an appropriate service center in accordance with data contained in the pre-paid account record; detecting an answer of the routed call by a service agent; and debiting an account balance in the pre-paid account record, responsive to the operation of detecting an answer.

BRIEF DESCRIPTION OF THE DRAWINGS

FIGS. 13A, 13B, and 13C depict a table describing exemplary account record for a pre-paid service card account in accordance with the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

Figure 1:
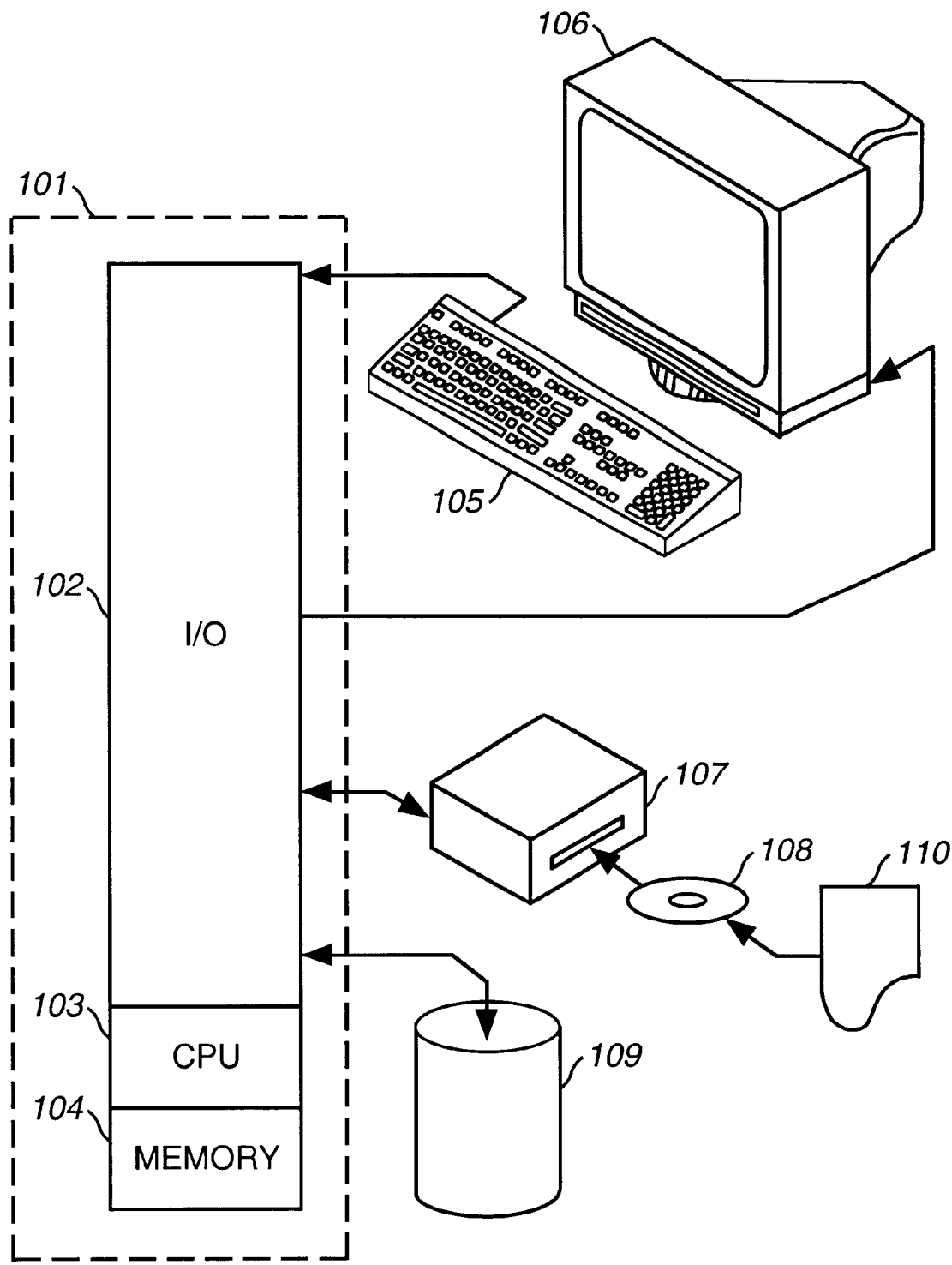
FIG. 1 depicts a general purpose computer useful for implementing an exemplary embodiment of the present invention.

One operating environment in which the present invention is potentially useful encompasses the general purpose computer. In such a system, data and program files may be input to the computer, which reads the files and executes the programs therein. Some of the elements of a general purpose computer are shown in FIG. 1, wherein a processor 101 is shown having an input/output (I/O) section 102, a Central Processing Unit (CPU) 103, and a memory section 104. The present invention is optionally implemented in software devices loaded in memory 104 and/or stored on a configured CD-ROM 108 or storage unit 109 thereby transforming the computer system in FIG. 1 to a special purpose machine for implementing the present invention.

The I/O section 102 is connected to keyboard 105, display unit 106, disk storage unit 109, and disk drive unit 107. Generally, in contemporary systems, the disk drive unit 107 is a CD-ROM driver unit capable of reading a CD-ROM medium 108, which typically contains programs 110 and data. Computer program products containing mechanisms to effectuate the apparatus and methods in accordance with the present invention may reside in the memory section 104, on a disk storage unit 109, or on the CD-ROM medium 108 of such a system. Alternatively, disk drive unit 107 may be replaced by a floppy drive unit, a tape drive unit, or other storage medium drive unit. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, software program modules may be executed by CPU 103, and pre-paid card account data elements and other data may be stored on disk storage unit 109, disk drive unit 107 or other storage medium drive units coupled to the system.

Figure 2:
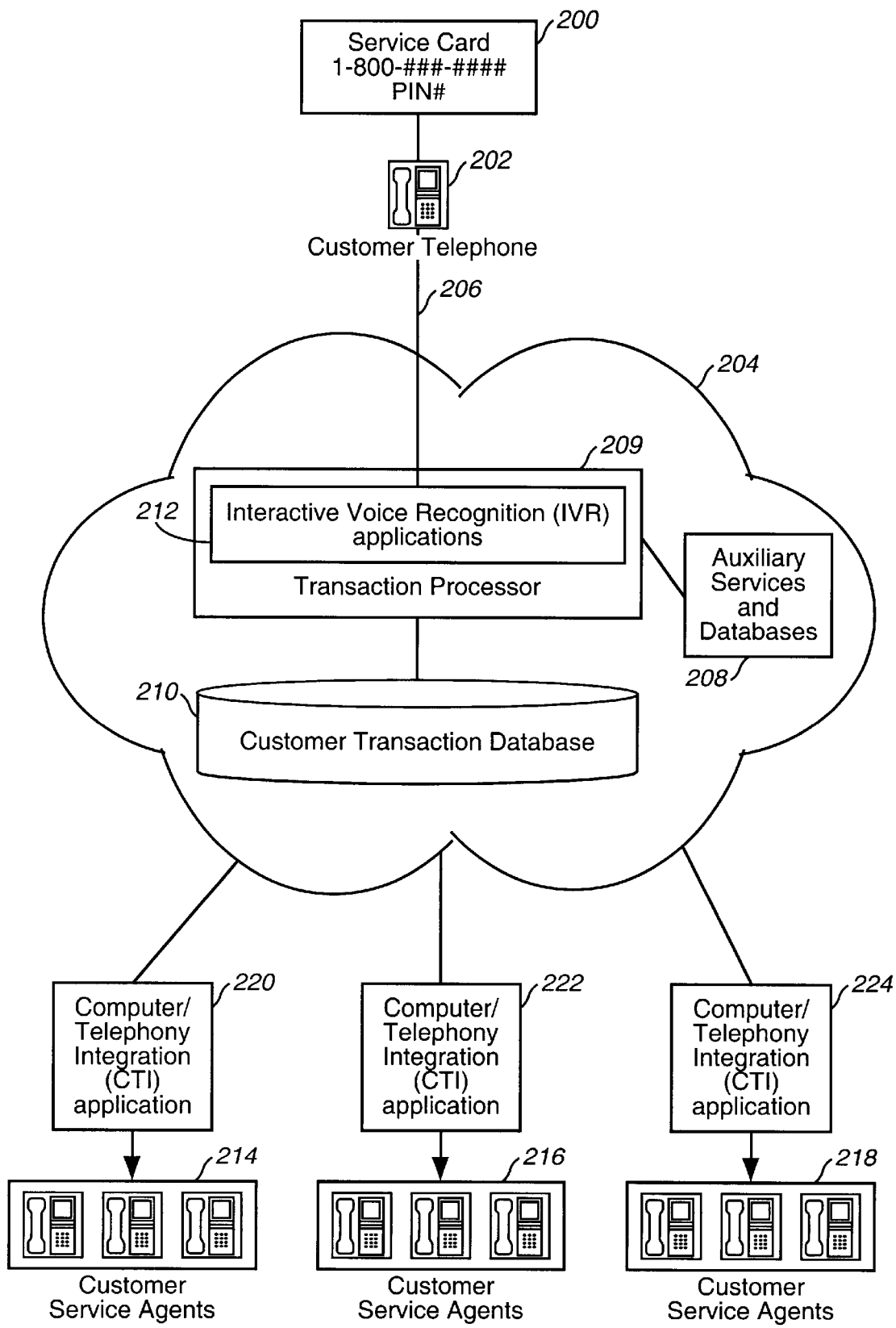
FIG. 2 is a high-level illustration of a system for providing automated customer services in accordance with the present invention.

FIG. 2 depicts a customer service network 204 having a transaction processor 209 in accordance with the present invention. Transaction platform 209 comprises a service card platform capable of processing incoming calls in accordance with information provided by the caller and/or data stored in customer transaction database 210. Service card 200 is preferably included with a product, although it may be purchased separately. Service cards may be made available to customers of participating vendors that allow customers to obtain vendor support of purchased goods. In an exemplary embodiment, a unique Personal Identification Number (PIN), or a customer identification number, is assigned to a customer service account. The PIN is preferably recorded on the service card 200 along with a toll-free access number, which may be common for several or all pre-paid accounts. Recording may include without limitation printed text, bar codes, other visual markings, or magnetic or optical encoding. Generally, a customer calls the access number to receive service from a vendor. The call is routed through a transaction processor 209. The customer's PIN is provided to transaction processor 209, and the call is routed to an appropriate customer service agent in accordance with data read from the customer transaction database 210 (such as product type, model, vendor ID, etc.) and/or provided by the caller. The pre-paid card account is thereafter debited for the call in the appropriate debiting mode (e.g., per incident, per minute, etc.).

Service card 200 is associated with a pre-paid account configured on a customer transaction database 210. An account may include customer, vendor, and product information, such as a customer ID, vendor ID, product registration number, and product type. The pre-paid account preferably entitles a customer to a limited amount of customer service. A customer's service entitlement may be provided in various ways: first, a caller may be allowed to place a limited amount of service calls or incidents. Accordingly, limits may be placed on the number of service incidents, the duration of service calls, the total amount of service per unit of time, and the time period in which these incidents must be used (e.g., a card may be valid for one year from date of purchase or for 90 days from the date of first use). A second type of entitlement involves an unlimited number of calls not exceeding a predetermined amount of time in aggregate. If the balance of pre-paid service is substantially depleted, the customer is preferably given the opportunity to "recharge" the pre-paid balance (e.g., such as by providing a credit card number) to add additional service entitlement. Other limitations may also be applied to the amount of service available.

In an exemplary embodiment, a customer requiring service calls a service access telephone number, preferably a toll-free number displayed on the service card 200 itself. The customer's call originates at telephone 202 and accesses switched network 204 via Local Exchange Character (LEC) link 206, a dedicated access line, or any other common means. The call is received by Interactive Voice Recognition (IVR) application 212, which assists transaction processor 209 with automated interaction with callers. In addition to comprising its own database 210, transaction processor 209 is also coupled to auxiliary services and databases 208 to access to other network capabilities, such as operator assistance, automated routing, billing, and services provided by a service card vendor. For example, a product type read from the customer transaction database may be used to search an auxiliary database for selecting a specialized customer service center to provides support for the specific product. It should be understood that such routing information can also be recorded in the customer transaction database and/or be associated with other customer-related data, such as the PIN.

After some initial processing, the customer's service call is forwarded to an appropriate customer service agent. Such agents are preferably located at a Customer Service Center (CSC) such as 214, 216 or 218. A type of CSC is a customer support center that provide customers with, for example, technical support relating to a purchased product. A customer service agent preferably receives a customer service call through a Computer/Telephony Integration (CTI) application such 220, 222 or 224. A CTI application integrates telephony functions with a computer application, which for example allows a service agent to look up information about the customer or product during the call.

Figure 3:
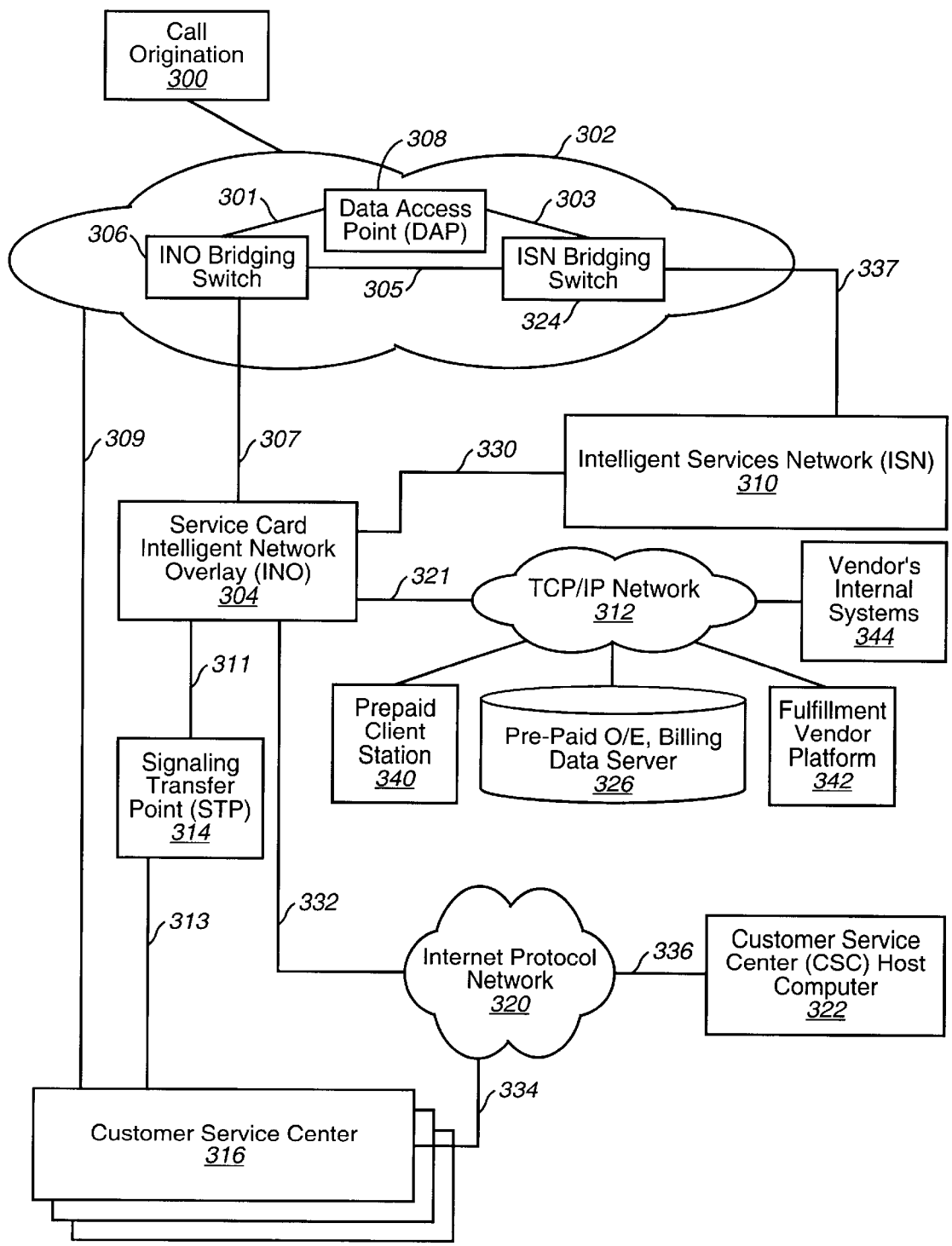
FIG. 3 is a detailed illustration of a system for providing automated customer services in accordance with the present invention.

FIG. 3 depicts a more detailed representation of a service card system in accordance with the present invention, wherein the transaction processor 209 of FIG. 2 comprises service card Intelligent Network Overlay (INO) 304. A customer service call is originated in block 300. A customer call is typically initiated when a caller dials a special access number, preferably a toll-free number. A call may access switched network 302 via an LEC, a dedicated access line, or any other common means. Such a call is received into switched network 302, which preferably comprises, Data Access Point (DAP) 308, INO Bridging Switch 306 and Intelligent Services Network (ISN) Bridging Switch 324. Switches 306 and 324 are preferably linked to DAP 308 via communication links 301 and 303 employing a transactional telecommunications protocol, such as Application Data Field (ADF). As with other telecommunications links described herein, alternate protocols are also contemplated within the scope of this invention, including Signaling System 7 (SS7). Furthermore, switches 306 and 324 are themselves preferably linked by an Inter-Machine Truck (IMT) 305.

Based on the dialed access number, the switched network 302 routes the call to the service card Intelligent Network Overlay (service card INO) 304 via the INO bridging switch 306 and IMT 307. Switched network 302 may also link to CSC 316 via an IMT or a Release Line Trunk (RLT) 309. Service card INO 304 performs or manages the processing of the service card customer's call. Service card account data is preferably stored in a relational database in service card INO 304. In an exemplary embodiment, service card INO 304 is coupled via Ethernet link 330, which supports TCP/IP and Transaction Capability Application Part (TCAP) messaging (a protocol component of SS7 INAP messaging), to ISN 310 for accessing operator assistance services, network data, and other intelligent services. Service INO 304 is also coupled via Ethernet link 321 and TCP/IP network 312 to pre-paid client station 340, data server 326, fulfillment vendor platform 342, and the internal systems 344 maintained by the vendor of the service or service card.

In addition, service card INO 304 is preferably coupled via SS7 links 311 and 313 to one or more CSC's (such as 316) through a switch, such as Signaling Transfer Point (STP) 314. CSC 316 typically comprises multiple service agent stations among which multiple calls are distributed by an Automatic Call Distribution (ACD) application, which allows large numbers of incoming calls to be answered and automatically directed to a specific service agent or department within the organization. Each CSC preferably includes an ACD, a plurality of service agent stations, a Computer/Telephony Integration (CTI) Server, and an Ethernet LAN. Additional elements of a typical CSC, such as database servers and resource monitors, may also be included but are not shown.

Ethernet link 332 connects a relational database system in Support Card INO 304 to Internet Protocol network 320. In this manner, a service agent at CSC 316 can access a customer transaction database in SDP 404 via Ethernet link 334 and Internet Protocol network 320. Additionally or alternately, CSC Host Computer 322 comprises a database system, for example, owned and operated by the product vendor for storing pre-paid service card account information. CSC Host Computer 322 can be accessed by Service Card INO 304 and CSC 316 via Ethernet link 336 and Internet Protocol network 320, preferably a private Intranet or Extranet but potentially a public Internet. As with all network links described herein, other network configurations and protocols are contemplated within the scope of this invention, including Asynchronous Transfer Mode (ATM), Fibre Channel, wireless, and satellite links.

Figure 4:
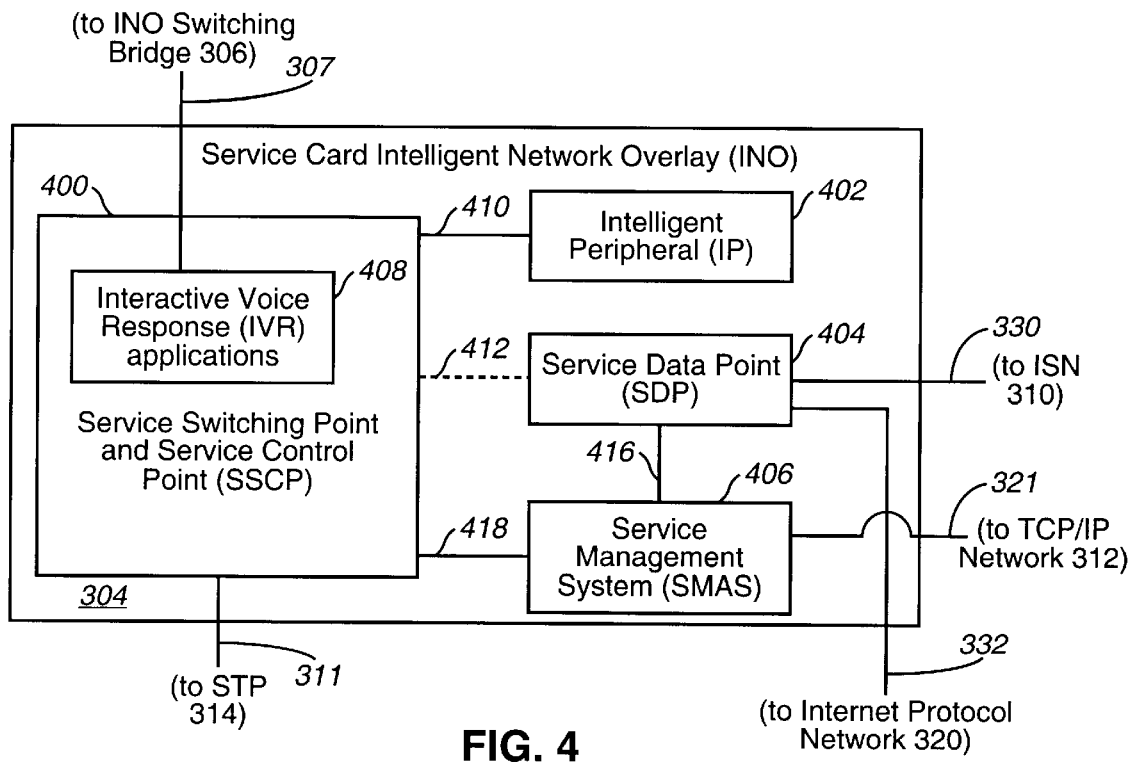
FIG. 4 illustrates exemplary components of the service card intelligent network overlay of FIG. 3.

FIG. 4 depicts a more detailed block diagram of the Service Card INO 304 of FIG. 3. Service Card INO 304 preferably comprises a combined Service Switching and Service Control Point (SSCP) 400, Intelligent Peripheral (IP) 402, Service Data Point (SDP) 404, and Service Management System (SMAS) 406. The SSCP 400 includes Interactive Voice Response (IVR) applications 408 to receive a customer call from the INO Bridging Switch (306 of FIG. 3) for initial processing. The IVR applications 408 act as gateways for the calls and receive routing instructions from a database coupled to SDP 404. The IVR applications 408 have the ability to interact with a database coupled to SDP 404 as well as possibly a vendor's database (such as shown at 326 in FIG. 3) through a host connect application. The IVR applications 408 can allow vendors to change IVR recorded messages from a remote location. In one embodiment, the IVR applications 408 are programmed to handle a plurality of vendors at the same time, providing a cost effective solution to multiple customer service calls.

An exemplary SSCP is based on an Ericsson ACE-10 switch with built-in intelligent call processing and IVR processing modules. The IP 402 is a Network Audio Server or Voice Response Unit (VRU) that interacts with callers, providing voice prompts and accepting call input via Dual-Tone Multi-Frequency (DTMF) signals (e.g., telephone touch tones) or speech recognition. The resources of IP 402 are driven by the IVR applications 408 that execute on SSCP 400. Thus, the SSCP has both voice trunks and data links, shown generally at 410, to IP 402. Voice trunks are used to connect callers with voice ports on IP 402, and data links are used to send IVR application commands and audio messages to the IP and to communicate caller input as DTMF signals or speech recognition data from IP 402 to SSCP 400.

The SDP 404 is a database management system that includes one or more relational databases that store call processing data and customer account data. Pre-paid card account records preferably are stored in an SDP database. Information collected before, during, and after the product purchase relating to the product vendor, the customer, and the product is recorded in an account record. For example, pre-paid card account statuses include: generated (but not activated), activated, expired, and suspended. These statuses may be used to validate the customer's call by evaluating the status corresponding to the PIN. If the customer's call is validated, the customer is authorized to receive services in accordance with the terms and the balance of their pre-paid service account. The data in the pre-paid account may vary but in general includes warranty and product registration information, service entitlement information and service processing and history information. Intelligent call processing applications in SSCP 400 interface with SDP 404 via TCAP messaging link 412.

The SMAS 406 is coupled via link 321 to the Internet Protocol network 312 of FIG. 3 to other service management components, such as client stations for service creation. In this manner, SMAS 406 can provide service creation, order entry, and provisioning functions for the service card INO 304. Furthermore, SMAS provisions SSCP 400 via an X.25 network 418, and provisions SDP 404 via an Ethernet LAN 416.

Referring to FIGS. 3 and 4, a user can dial a predetermined access number to access the service card network, including switched network 302 and service card INO 304. Switched network 302 routes the call via INO bridging switch 306 to SSCP 400 of service card INO 304. The SSCP receives the call and routes the call to a voice port on the IP 402, which executes a software application for pre-paid card services. The portion of the call from call origination 300 to IP 402 is referred to a "call leg A".

The IP 402 preferably greets the caller, determines the proper language to be used during the call, and prompts the caller to enter a PIN, which is usually printed on the card. The PIN is used to authenticate the caller and to access the caller's pre-paid account on SDP 404. The PIN also allows IVR applications 408 to track the number of calls made by the customer and the type of services provided to the customer. The PIN is collected by IP 402 and provided to SSCP 400, which retrieves the pre-paid account from the SDP 404 and authenticates the caller. If the PIN is invalid or expired, an appropriate announcement is made and the call is terminated. If the card's pre-paid balance is depleted and the customer cannot or does not which to recharge the pre-paid account, an appropriate announcement is played and the call is terminated. If the account is rechargeable (and the customer wishes to replenish the pre-paid account), processing can transfer to ISN 310 for operator assistance. Alternately, the service card INO 304 may recharge the balance in an automated manner, such as by using the caller's DTMF capability or by voice recognition.

The IP 402 then, if necessary, prompts the caller for information required to determine a terminating number, collect the corresponding terminating number information from a database, and provide it to SSCP 400. A terminating number is, for example, the access number of a specific service agent or call center. In an exemplary embodiment, IP 402 prompts the caller with a menu hierarchy that directs the customer through a sequence of questions, which are answered by key presses at the customer's touch tone phone or by voice responses. The terminating number information is preferably determined from a database coupled to SDP 404. Each terminating number supported by IP 402 is assigned a rate having a predetermined unit rate and method (e.g., per call, per minute, etc.). Other termination number information includes the PIN, the selection menu option, the maximum call duration, and the current pre-paid service balance corresponding to the customer. Some service cards may have only a single terminating number; therefore, the call can be transferred directly to the ACD corresponding to that terminating number without caller intervention.

SSCP 400 causes IP 402 to outpulse the digits of the terminating number to place a call over a switched network to the termination, typically a CSC, such as CSC 316. The portion of the call from IP 402 to CSC 316 is referred to a "call leg B". Consequently, IP 402 is party to two temporarily separate call portions. By maintaining control of call legs A and B, IP 402 can continue to provide pre-paid card services. If the call of call leg B is answered, SSCP 400 causes IP 402 to connect call leg A with call leg B, and the call proceeds.

When a service card is supplied with a vendor's product, an associated pre-paid account is provisioned on the SDP 404. The account may be provisioned with a set amount of customer service in terms of a number of calls, a number of call minutes, or some other metric. The service card may also be provisioned with no entitlement, if the product vendor so desires, requiring the customer to pay for initial service. Other information may also be included in the account, as the product vendor desires. Such information may be completely or selectively available to a service agent from the account database when the customer calls in for customer service. In an exemplary embodiment, customer information can be presented to a customer service agent at his or her workstation before the agent answers the customer's call. The information can include without limitation warranty information, recall information, customer identity, vendor location, and rebate information. Accordingly, the customer need not provide this information over the phone before receiving service.

Any information included in a pre-paid service card account may be used as criteria for intelligent call routing. For example, the SSCP 400 can route a received call to one of multiple CSCs based on the product type information it retrieves from a pre-paid account database. This capability allows a product vendor to intelligently distribute calls among multiple CSCs or equivalently multiple groups of agents at one or more CSCs. For example, CSC A can be specialized to provide customers with support for product A; CSC B can be specialized to provide customers with support for product B. A single access number can be used for all products, and the SSCP determines at call time the proper CSC or agent to receive the call.

If and when a pre-paid account balance is almost exhausted (e.g., 1 minute left), IP 402 prompts the caller (on call leg A) with an opportunity to recharge the caller's pre-paid account. A caller with DTMF capability may use an automated system controlled by service card INO 304. For callers without DTMF capability, or for callers who time-out while entering a DTMF signal when prompted to recharge their account, operator assistance may be provided by ISN 310, which has an Ethernet connection data link 330 (preferably supporting TCP/IP and TCAP messaging) to service card INO 304. A voice link is also provided via switched network 302, ISN Bridging Switch 324, and RLT 337.

Figure 5:
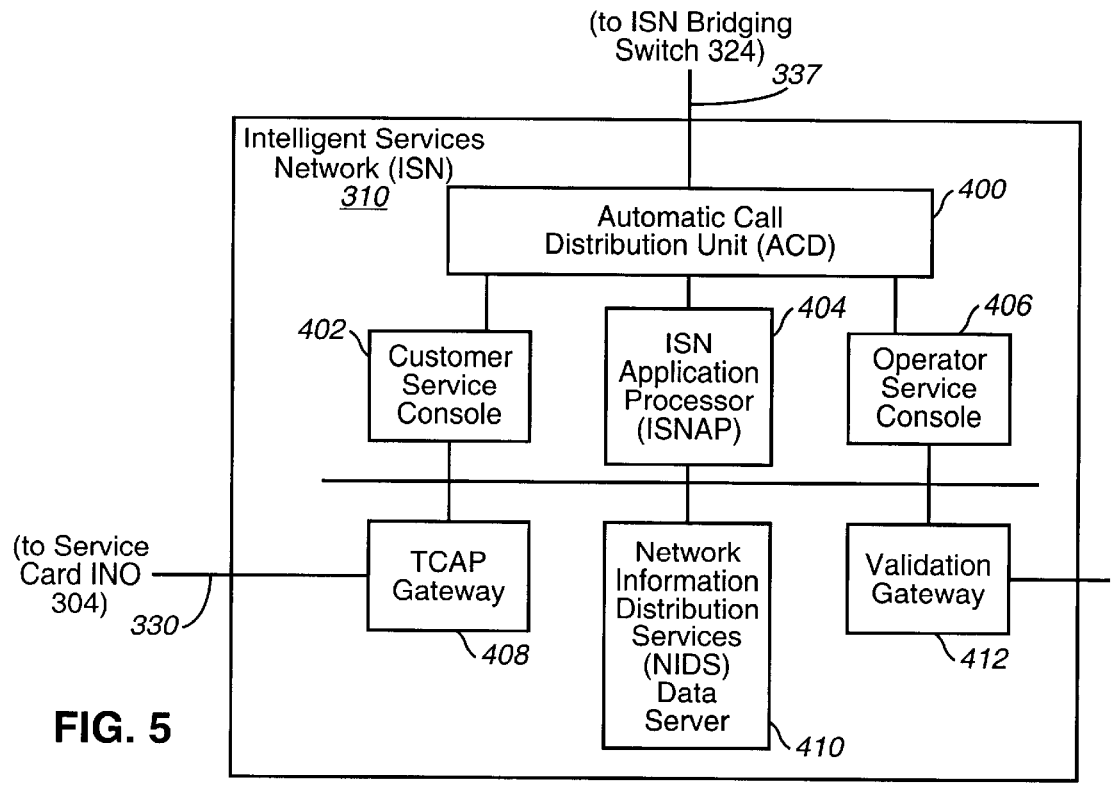
FIG. 5 illustrates exemplary components of the intelligent services network of FIG. 3.

FIG. 5 depicts a more detailed block diagram of the ISN 310 of FIG. 3. The ISN 310 preferably includes ISN ACD 400, customer service console 402, ISN Application Processor (INAP) 404, operator service console 406, TCAP gateway 408, Network Information Distribution Services (NIDS) data server 410, and Validation Gateway 412. The ISN 310 provides, in part, operator-assisted or automated recharging of a customer's account balance. The ISN 310 has a Ethernet data link 330 to the service card INO 304 via TCAP messaging over TCP/IP. The system and method for providing operator services for pre-paid cards are described and claimed in pending U.S. patent application Ser. No. 08/956,232, specifically incorporated herein by reference for all that it discloses and teaches.

Figure 6:
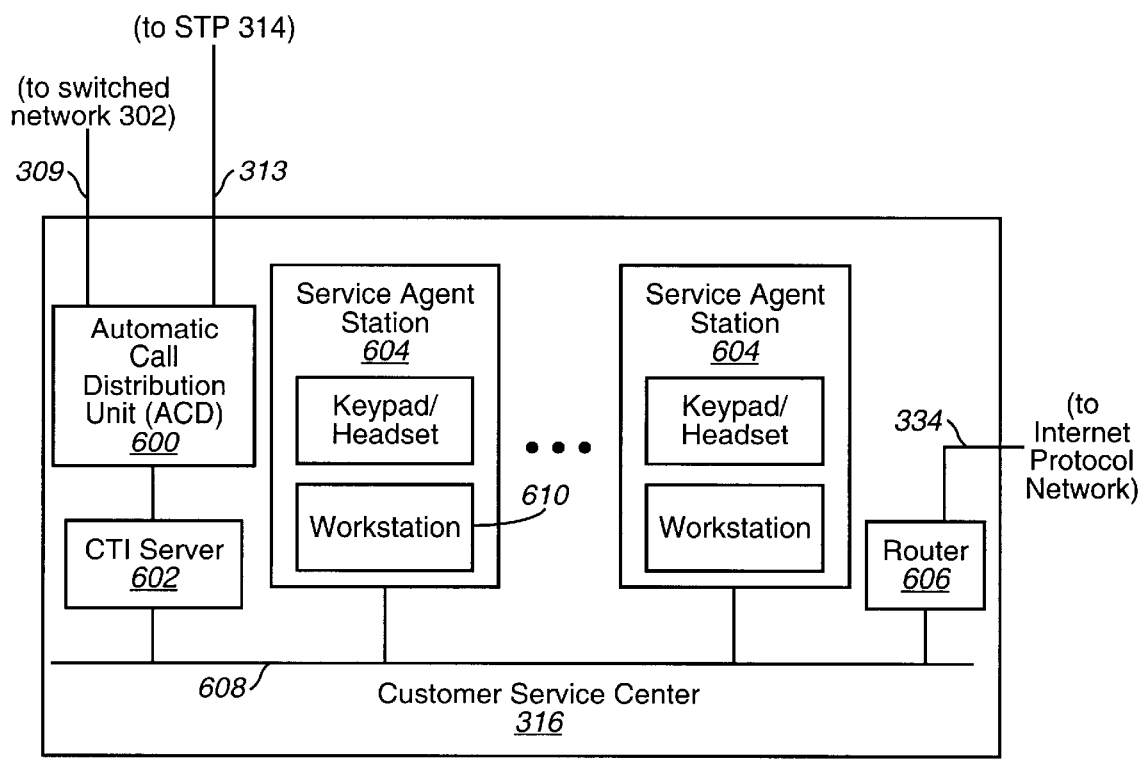
FIG. 6 illustrates exemplary components of the customer service center of FIG. 3.
Figure 7A:
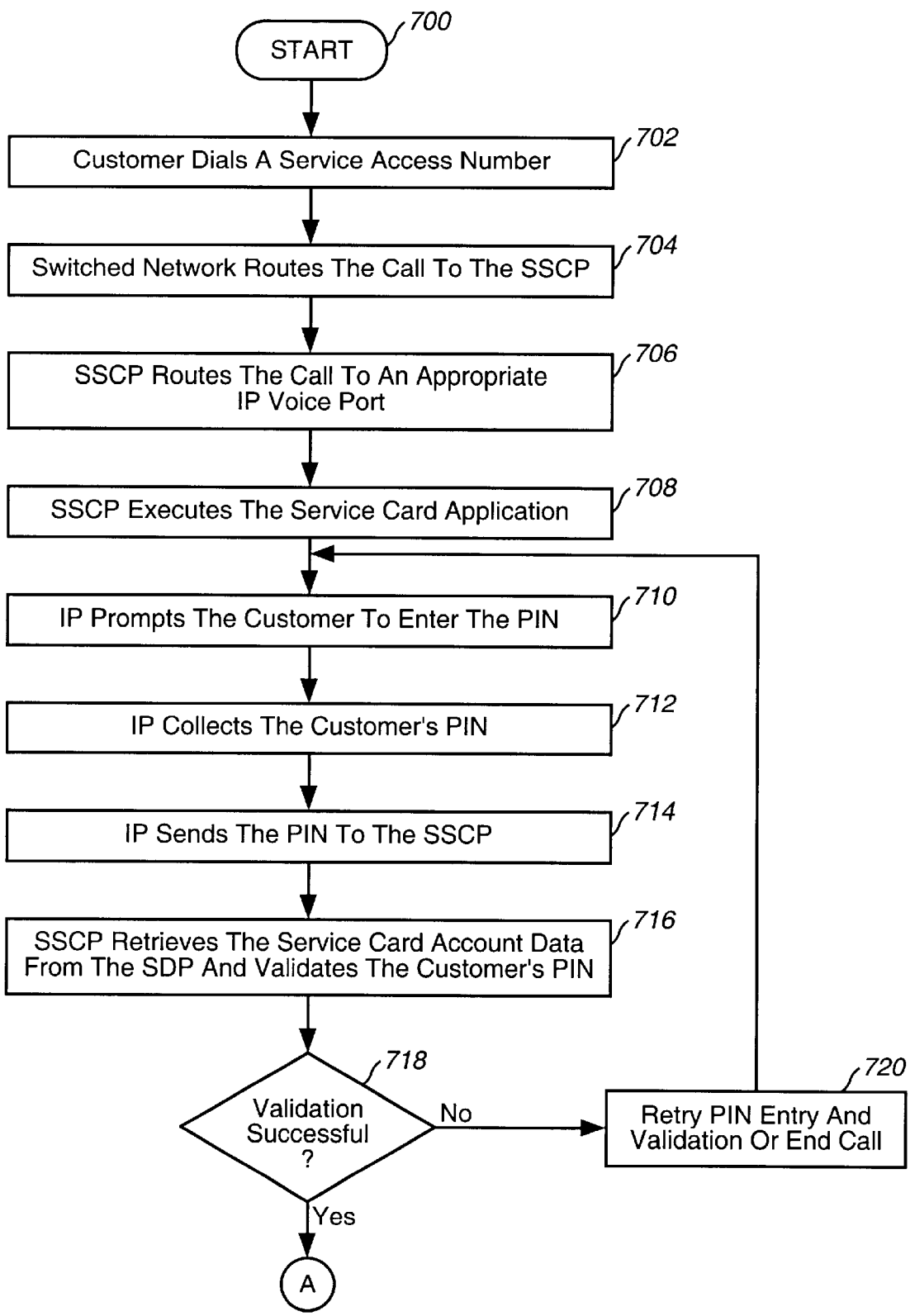
FIGS. 7A, 7B, 7C, 7D, and 7E depict a flowchart of a method for providing automated customer services in accordance with the present invention.
Figure 7B:
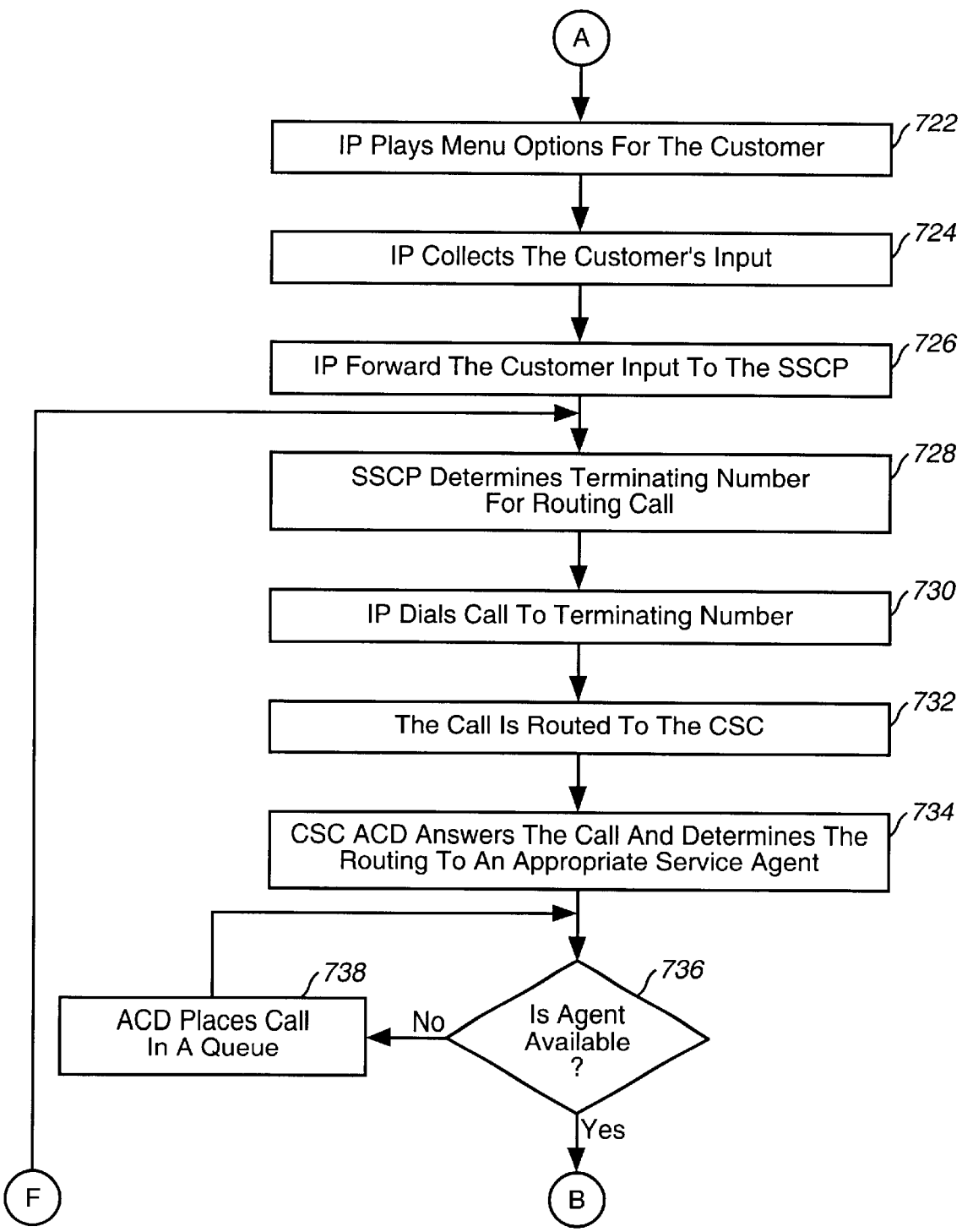
Figure 7C:
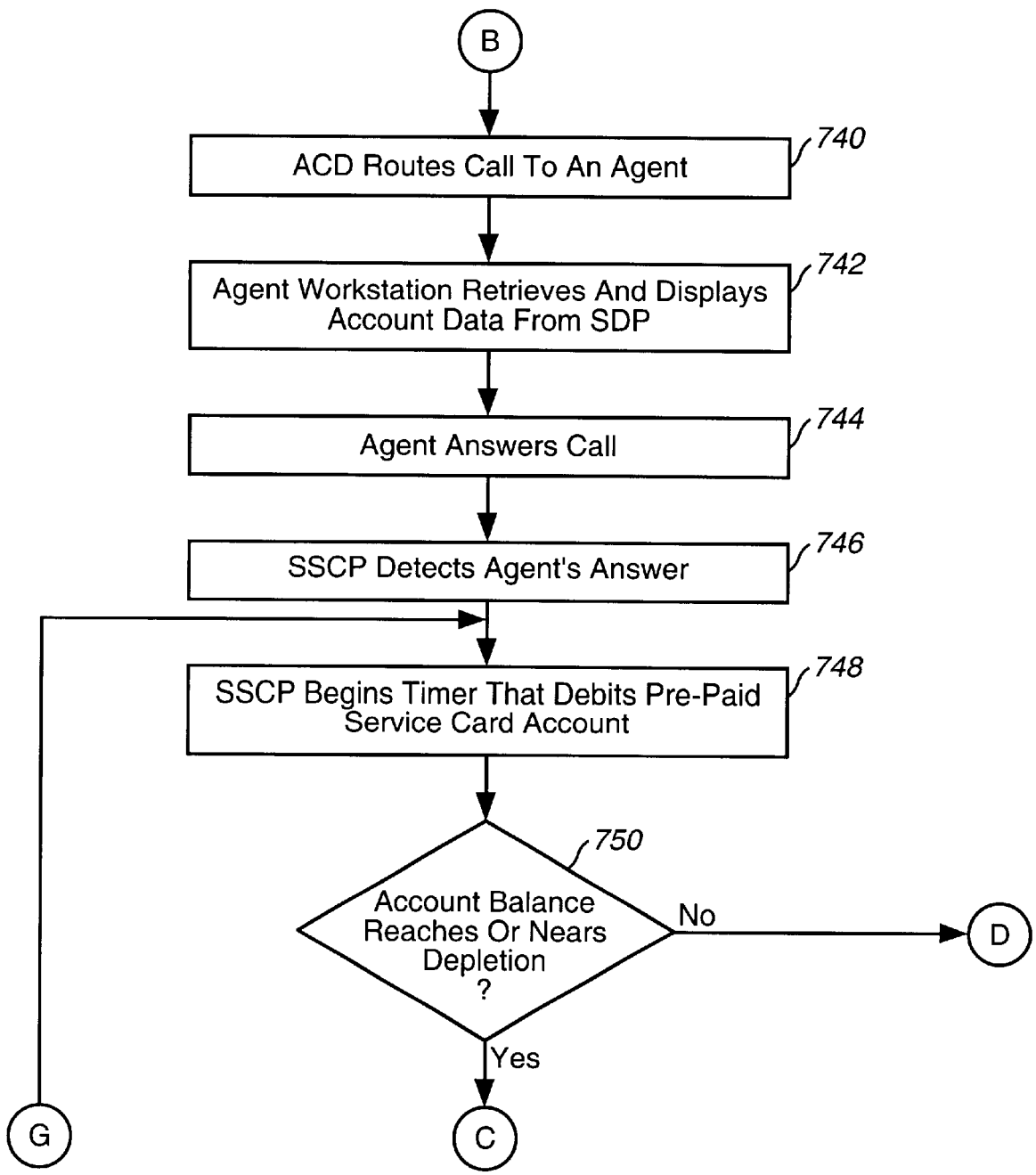
Figure 7D:
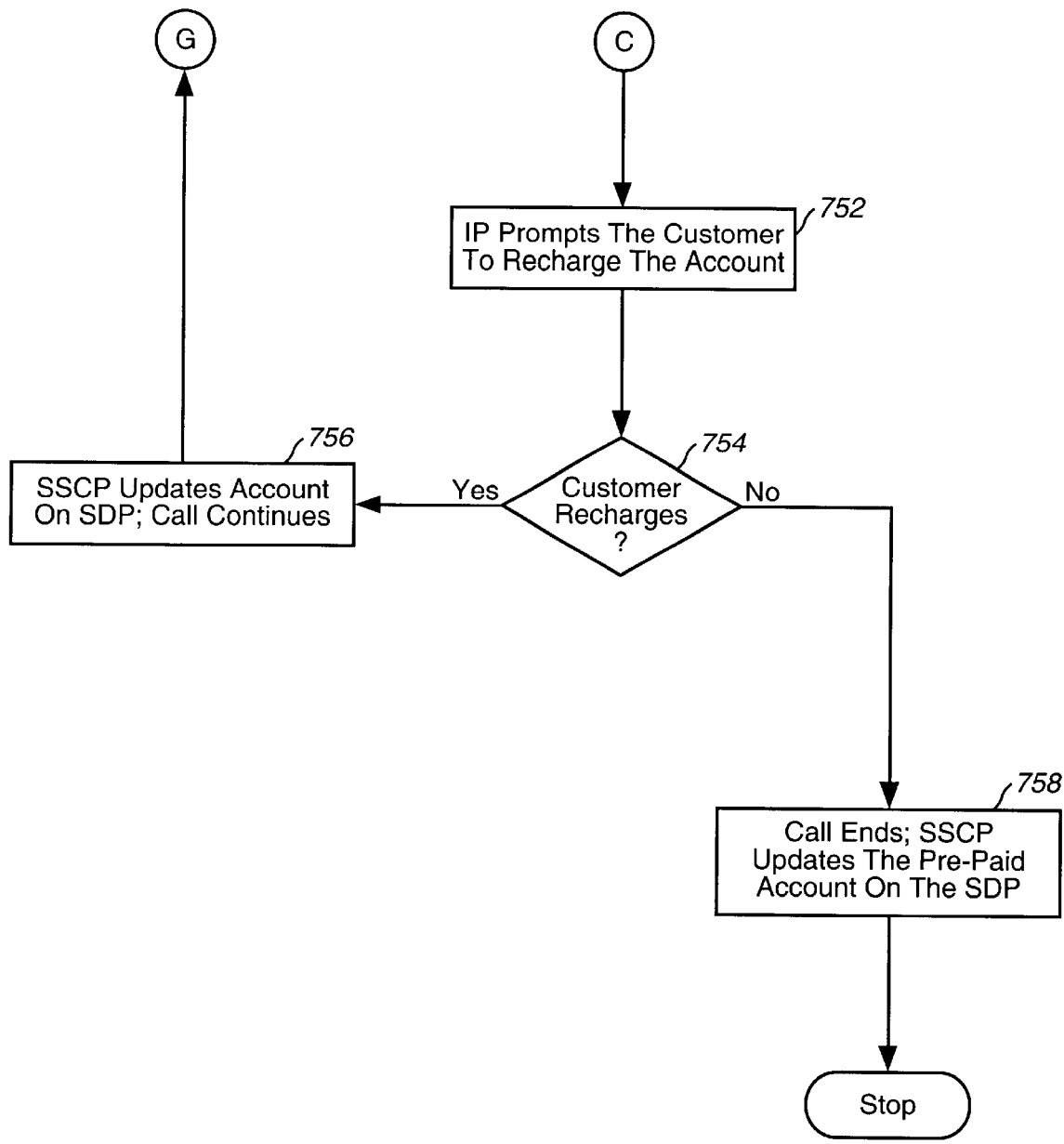
Figure 7E:
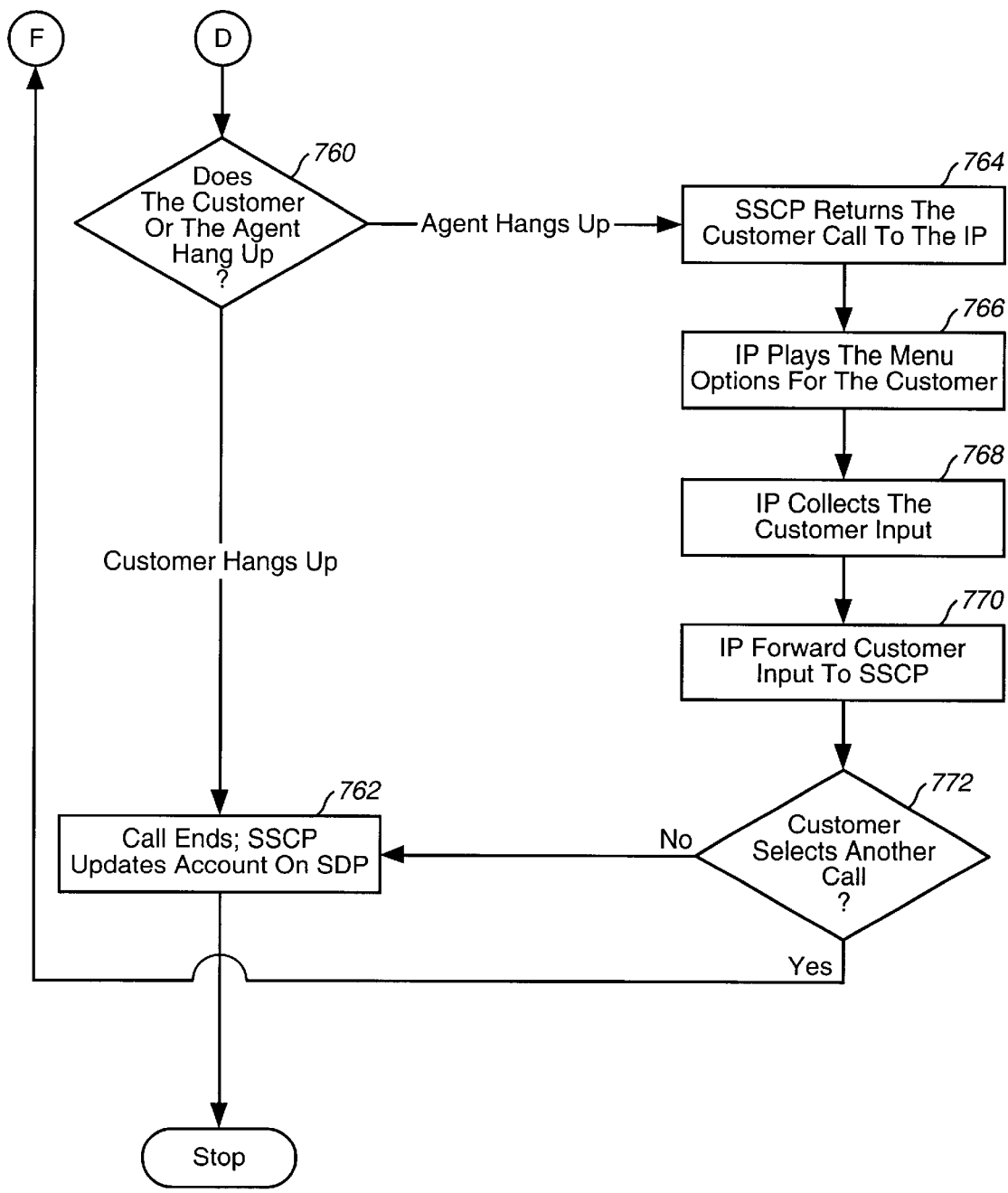
Figure 8A:
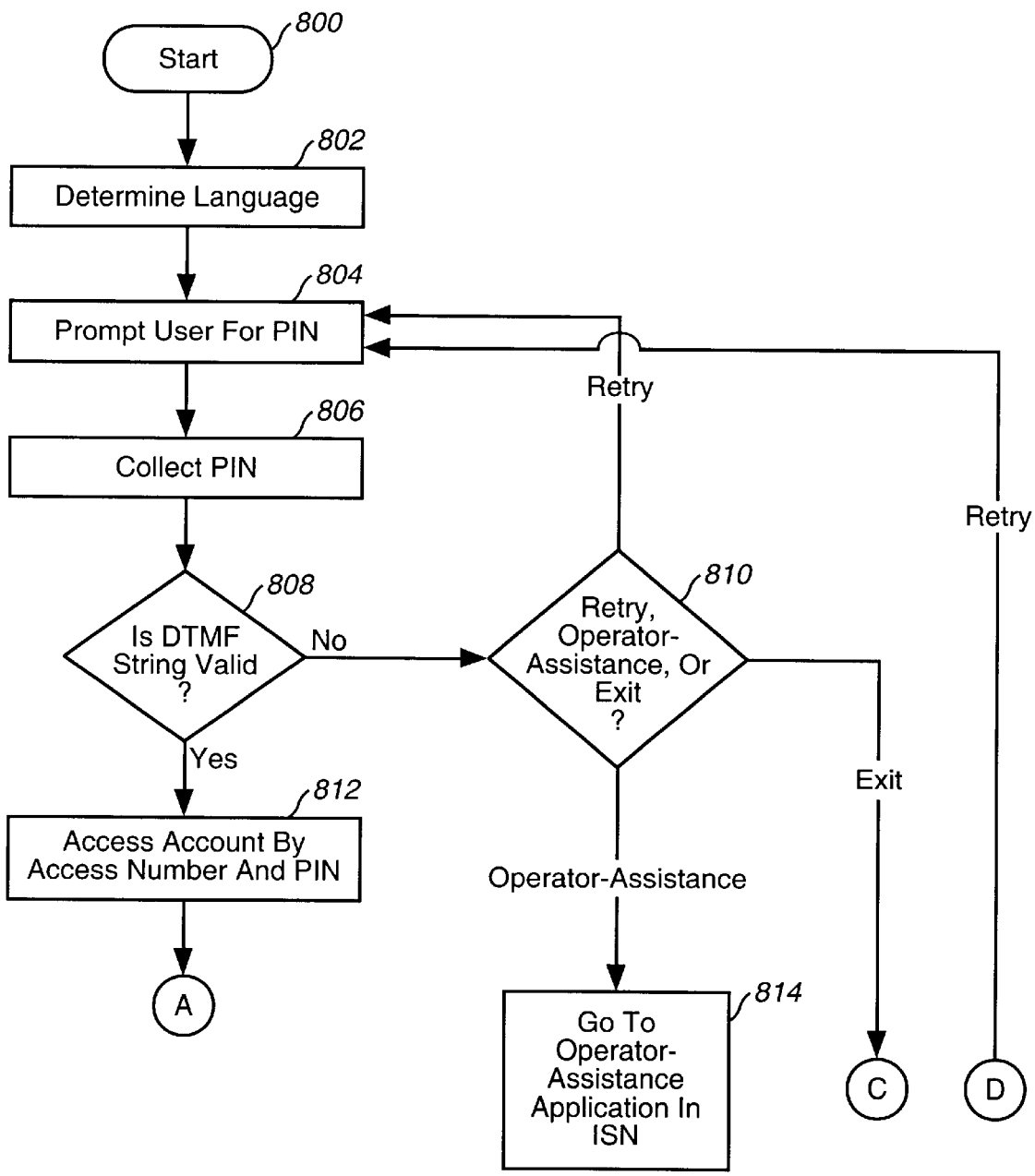
FIGS. 8A through 8I depict a detailed flowchart of a method for providing automated customer services in accordance with the present invention.
Figure 8B:
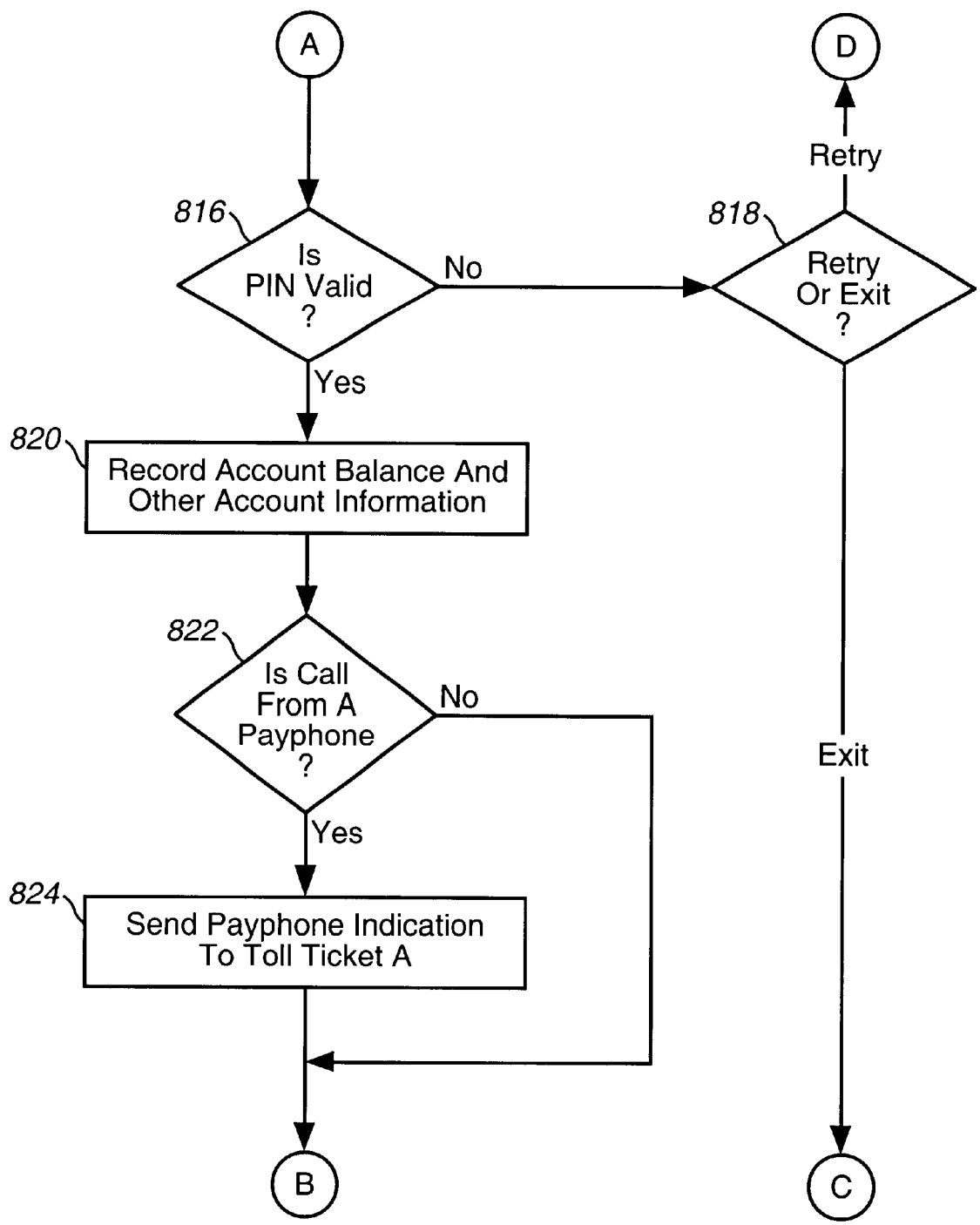
Figure 8C:
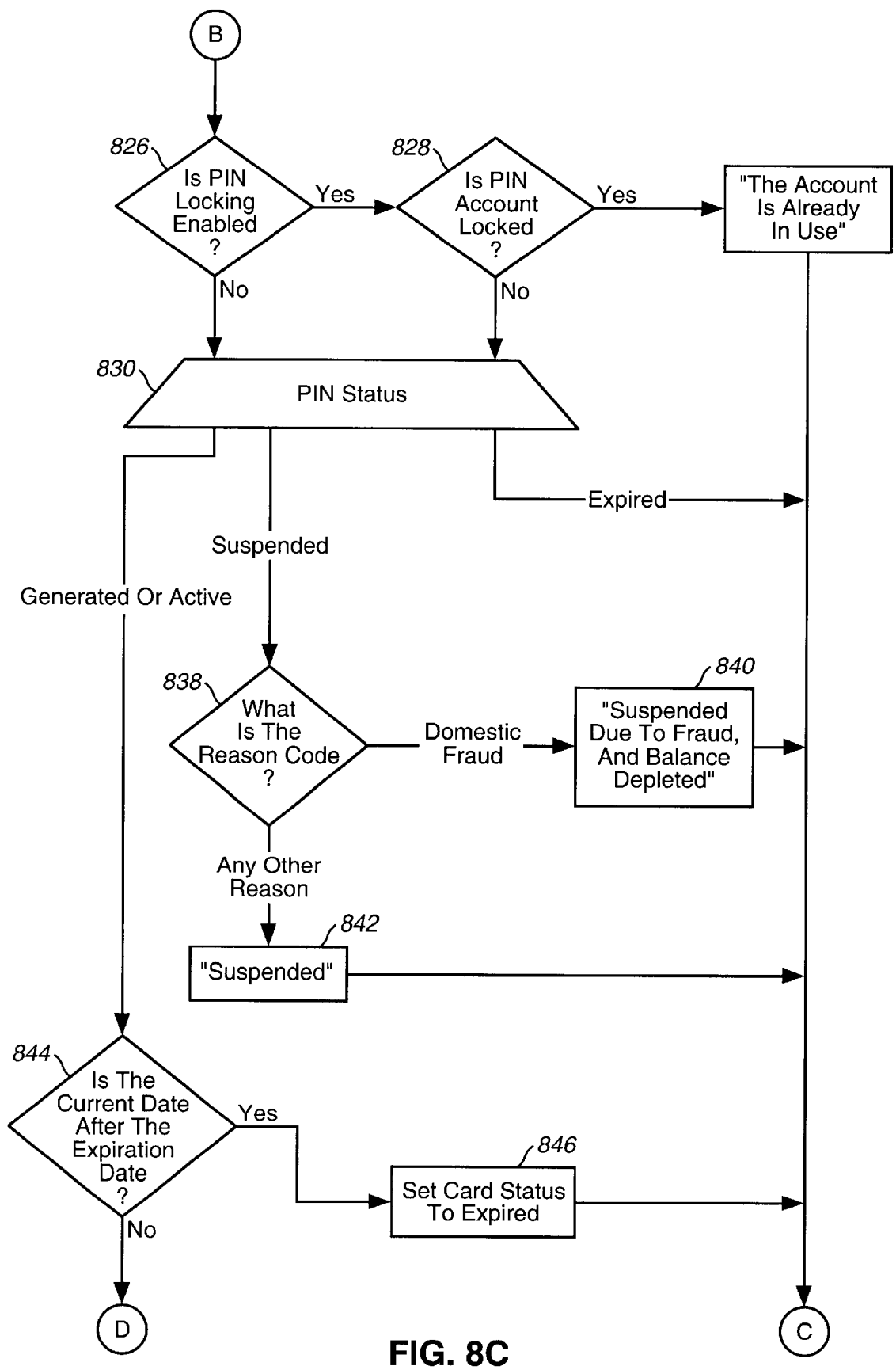
Figure 8D:
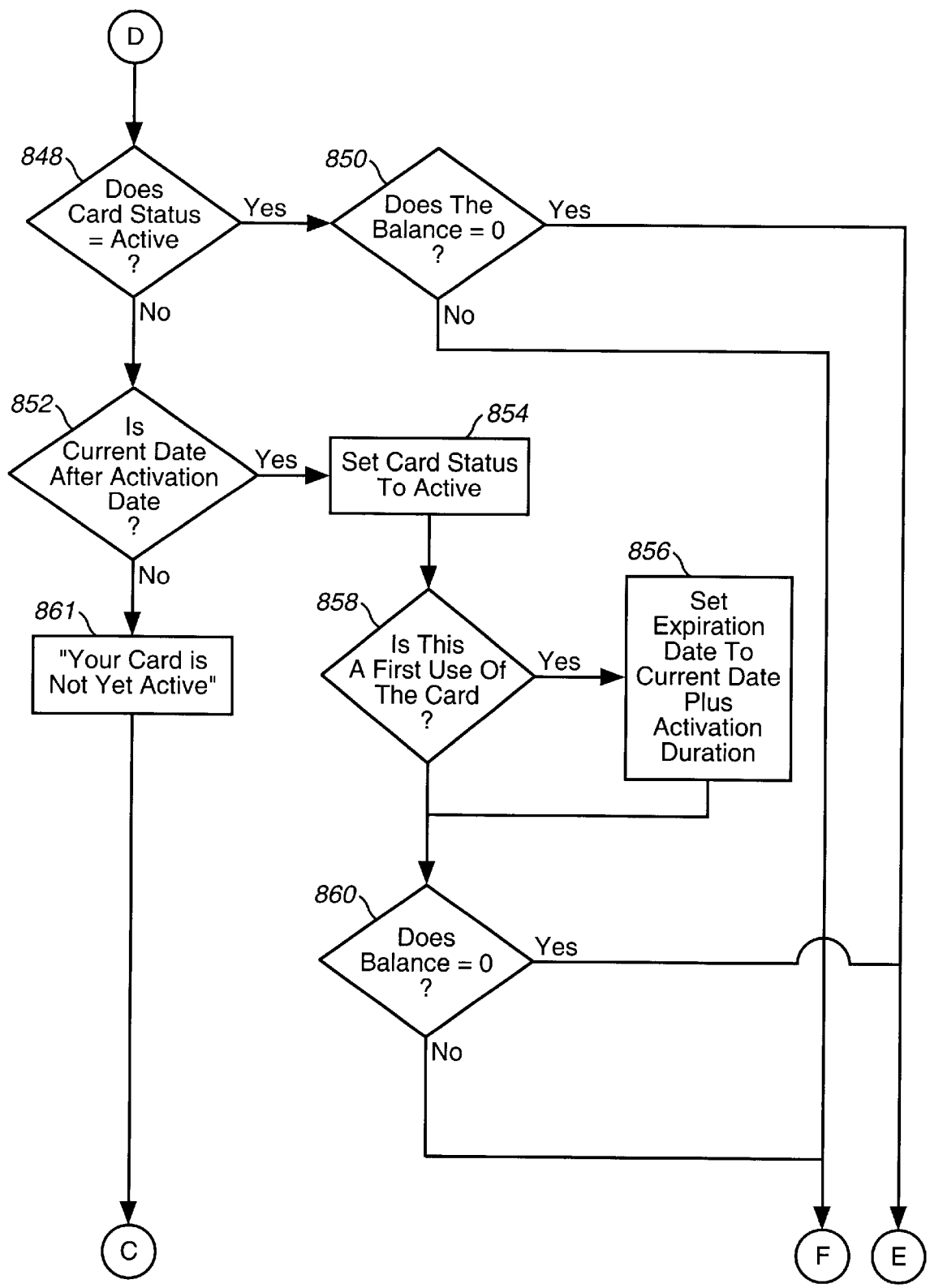
Figure 8E:
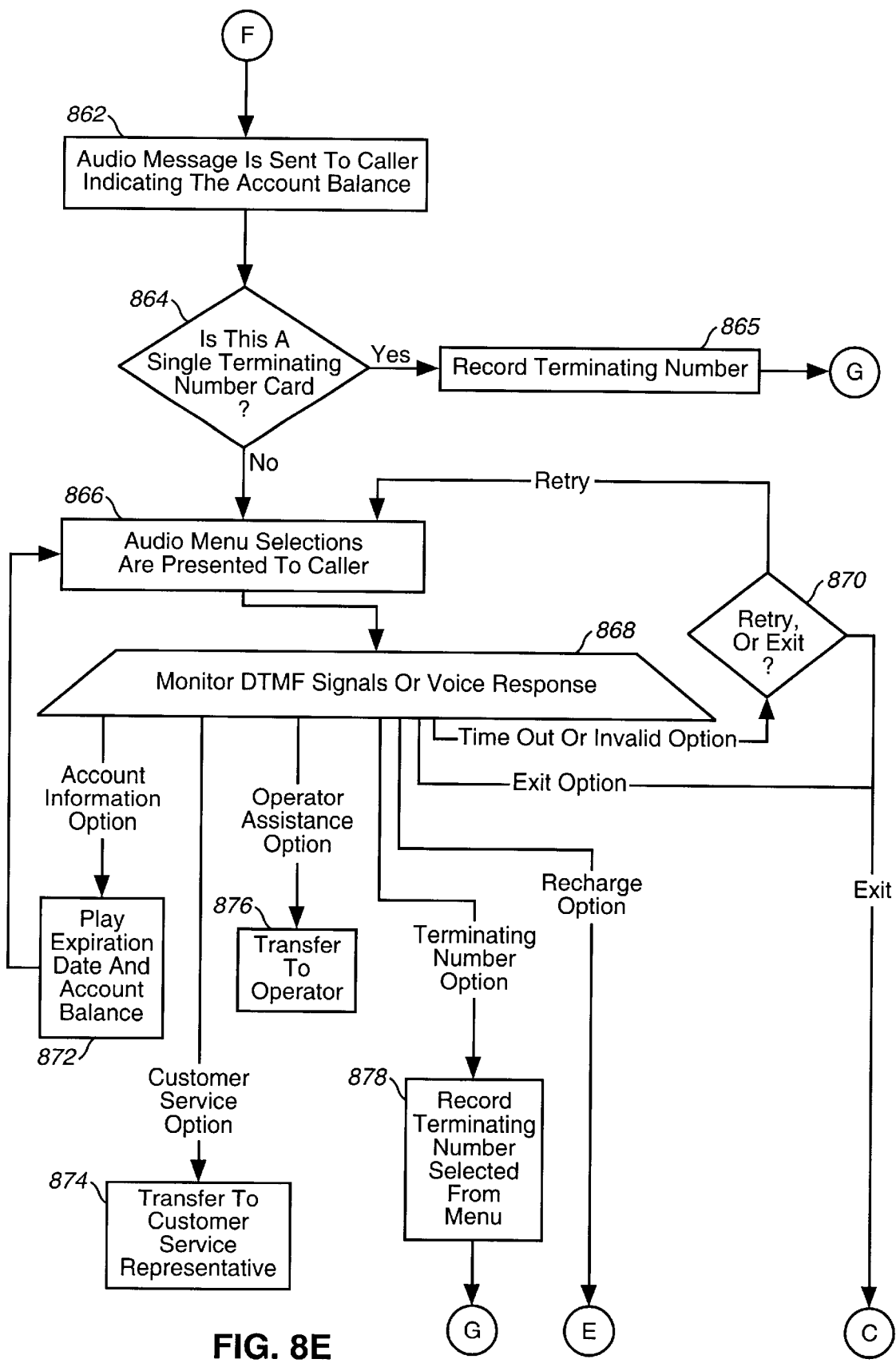
Figure 8F:
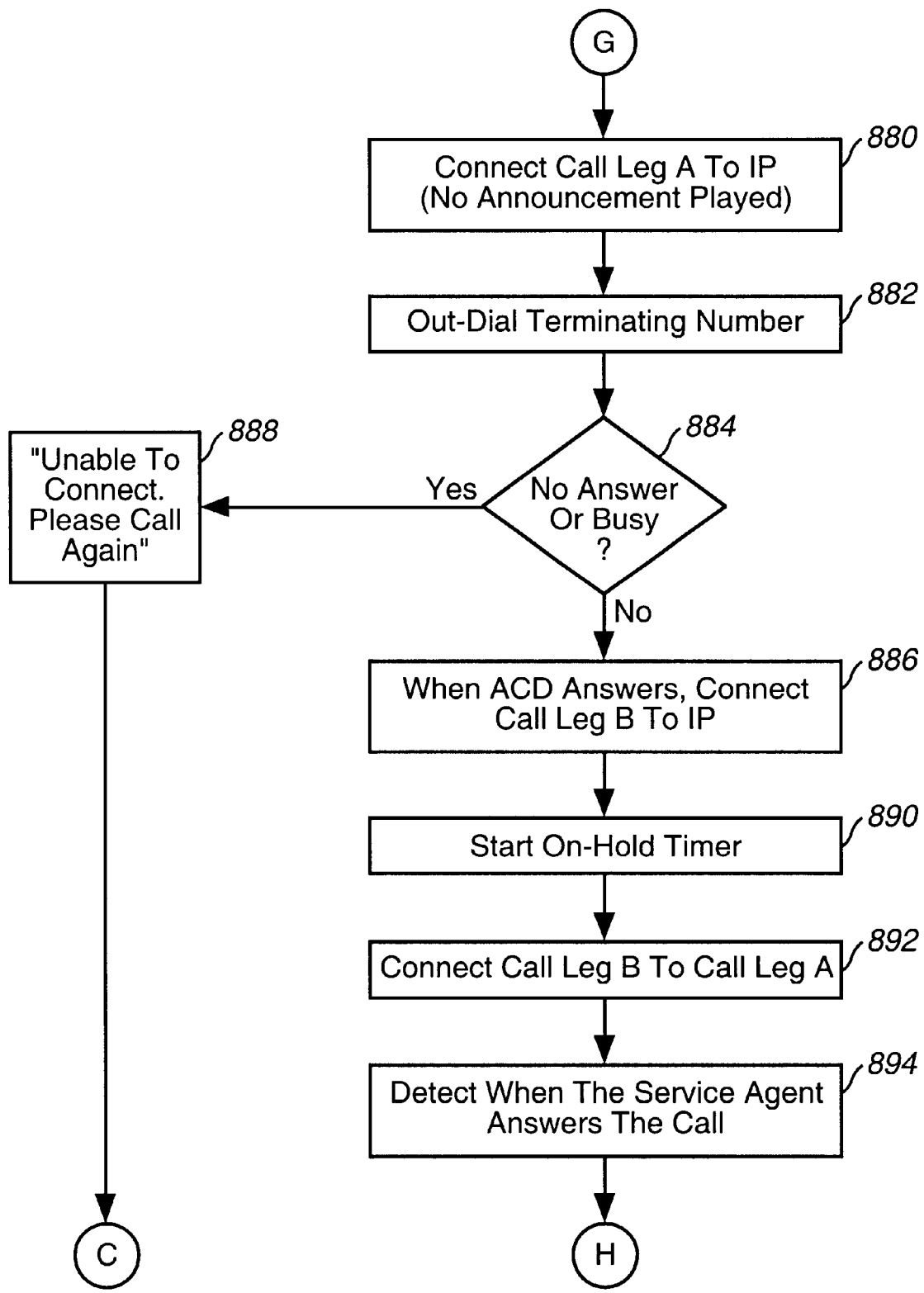
Figure 8G:
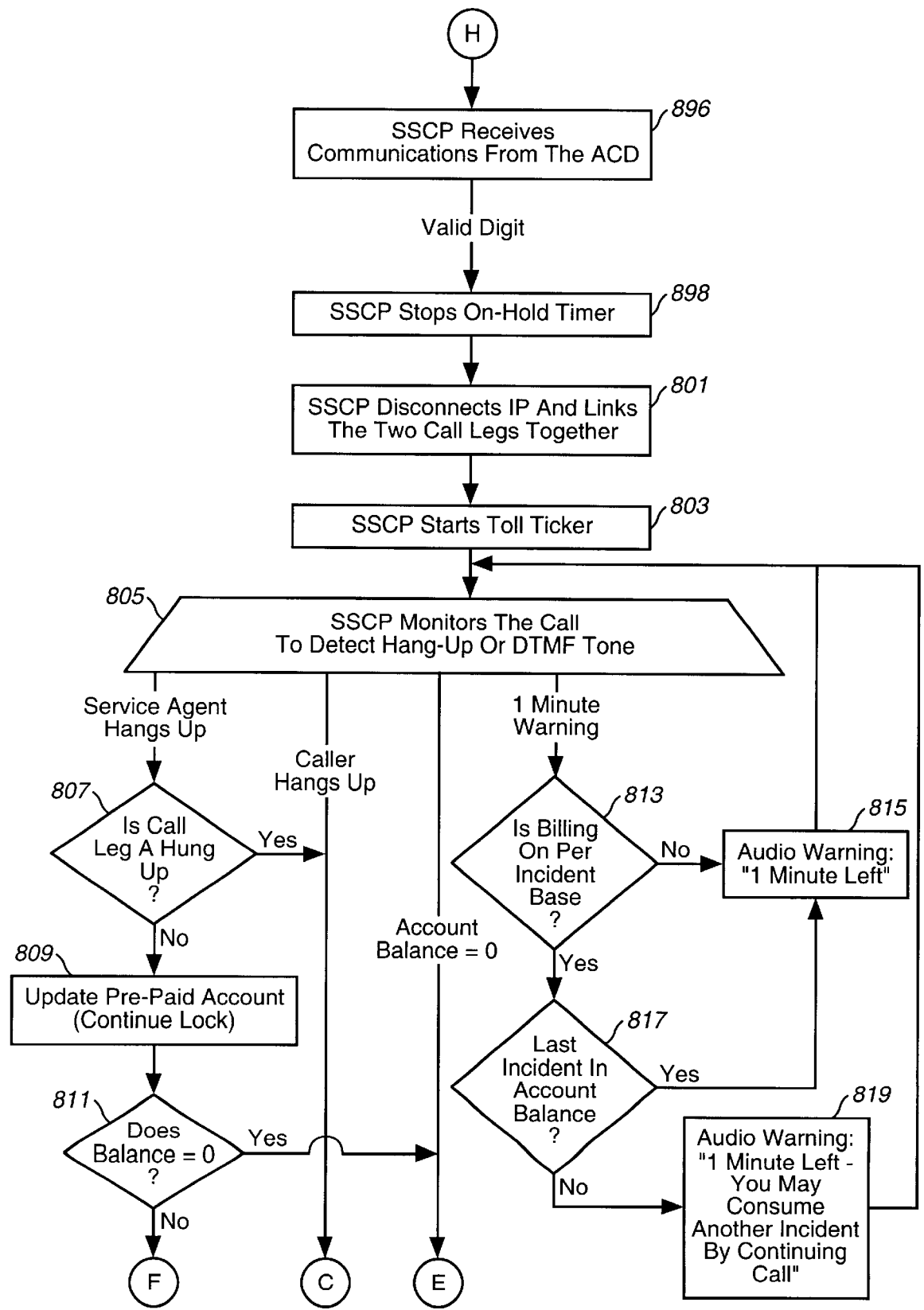
Figure 8H:
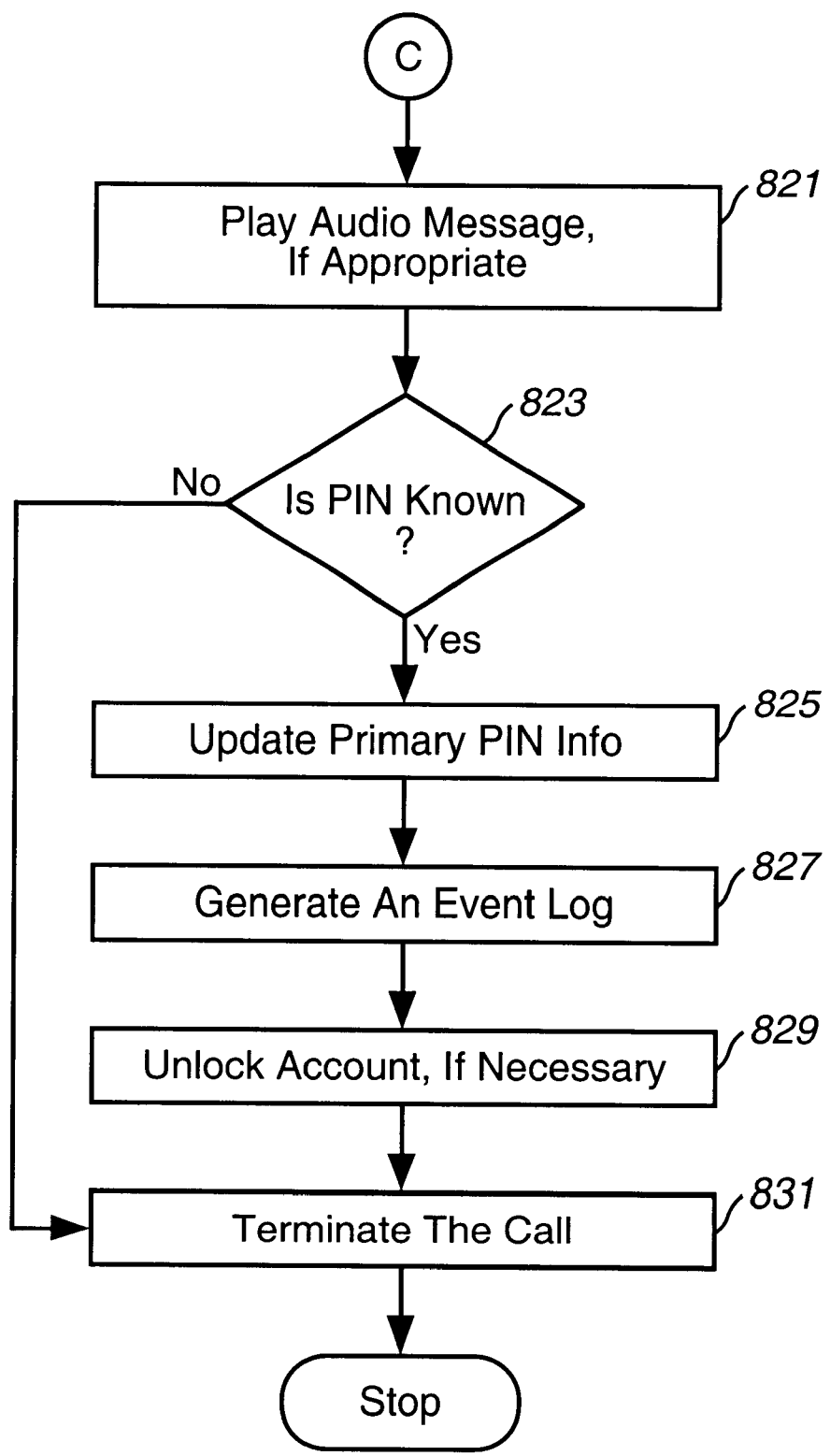
Figure 8I:
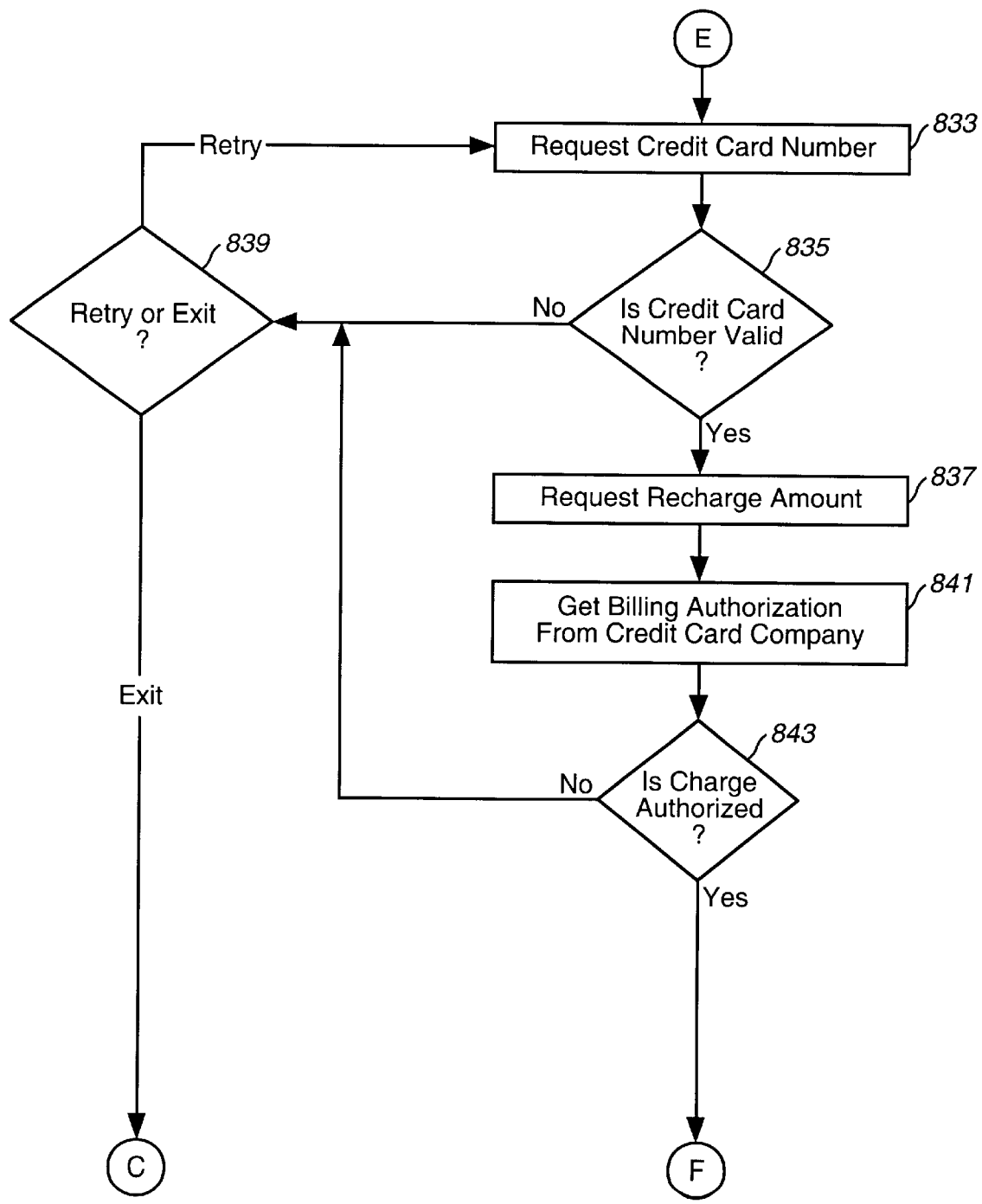

FIG. 6 depicts a more detailed block diagram of the Customer Service Center 316 of FIG. 3, which includes Ethernet LAN 608, ACD 600, control server 602, and service agent stations 604. Ethernet link 334 is part of Ethernet LAN 608, which also includes router 610. When service card INO 304 of FIG. 3 routes the call to ACD 600 through STP 314, the terminating number is actually outpulsed from the IP 402 of FIG. 4 but switched and routed through SSCP 400 of FIG. 4, using SS7 for call signaling. The SSCP 400 sends an Intelligent Network Application Part (INAP) message, which preferably includes the customer's PIN, to ACD 600 to process the call. When ACD 600 routes the call to an available service agent, it provides the PIN in a "call ordered" message that is sent to an appropriate agent station 610 via CTI server 602 and Ethernet LAN 608. Agent station 610, in accordance with a software application executing thereon, issues a TCP/IP query to the SDP 404 of FIG. 4 via Internet Protocol network 320 of FIG. 3. The PIN is preferably included in this query and used as a key in retrieving data from the customer's pre-paid account on SDP 404 of FIG. 4. Other data elements or combinations of other data elements can also be used as keys into the pre-paid account. The retrieved data is then sent to agent station 610 for access by a service agent.

FIGS. 7A, 7B, 7C, 7D, and 7E depict a flowchart illustrating the process performed within the network architecture of FIG. 2 to provide automated customer services using pre-paid accounts. Although the process is detailed and described herein presuming a network-based database, it should be understood that the process may be implemented on a more local level. The flowchart assumes that the customer has DTMF capability and does not time-out (i.e., fail to respond with required touch-tone operations within a predetermined period for response). At any time during the call to the transaction processor, the customer can time-out or enter a special DTMF signal (e.g., "#0") and be transferred to the ISN platform for live operator service, in accordance with U.S. patent application Ser. No. 08/956, 232.

The process commences at start 700. A customer dials a service access number, preferably printed on the surface of the service card, in operation 702. The access number is also preferably toll free, although local and non-toll free numbers are also useful within the scope of this invention. In operation 704, the call is routed through a switched network to an SSCP in a service card INO for processing the service call. Based on the dialed access number, the SSCP routes the call to a voice port on the IP in operation 706 and executes a service card software application in operation 708. The detailed process flow of the service card SSCP application is shown in FIGS. 8A–8I. In contrast, the process depicted in the flowchart of FIGS. 7A, 7B, 7C, 7D, and 7E is a high-level process performed by the entire network in providing the pre-paid card service, much of which is controlled by the SSCP.

In operation 710, the SSCP sends commands to the IP and causes the IP to play an audio message that prompts the customer to enter a PIN. In an alternate embodiment, the PIN may be captured by a technician and input into the system for proper routing and account maintenance. This embodiment is particularly advantageous when the customer transaction database is unavailable, for example, due to system malfunction. An ASCII text file or other database of captured PINs may be maintained and batch-processed at a later time to update the customer transaction database. Such processing, for example, can generate new account records or update existing account records in the customer transaction database. In yet another alternate embodiment, a batch number is associated with each group of PIN number captured. The batch number can be inserted into each PIN's account record.

In operation 712, the IP collects the customer's PIN, by receiving a DTMF or voice response from the customer, for example. The IP sends the collected PIN to the SSCP in operation 714. In operation 716, the SSCP uses the PIN as a key to retrieve the customer's pre-paid account record from a database on the SDP. The SSCP preferably records the account's balance in memory and attempts to validate the customer account in operation 718. For example, a PIN that does not correspond to an active pre-paid service card account record would typically result in a failure to validate or authorize the customer account. Alternately, other criteria, including additional caller responses, may be used to validate the account. If validation fails, then the SSCP can command the IP to prompt the customer for PIN re-entry in operation 720. This PIN validation sub-process can be repeated a predetermined number of times before the SSCP terminates the call.

If and when validation succeeds, the process proceeds to operation 722, where the SSCP commands the IP to play menu options for the customer. The IP collects the customer's selection or selections, which may also include other inputs such as DTMF or voice commands. Menu options may include, for example, options for contacting a service agent, contacting an operator for assistance with the pre-paid card service, updating or re-charging their service card account, or terminating the call. A number of options may also be offered for contacting a different service agent for different types of service. For example, "Press 1 for hardware support; press 2 for software support, press 3 for billing questions." The customer's input is sent to the SSCP by the IP in operation 726. In addition to or in place of a product type retrieved from the service card account, intelligent call routing can be based on this input from the customer.

In operation 728, the SSCP determines a terminating number for routing the call. The pre-paid card service can be used for both single number terminations and multiple number terminations. For a single number termination, all calls are routed to a single termination, such as a CSC or specific group of agents in a CSC. For a multiple number termination service, calls made to a single access number can be routed by the SSCP one of multiple terminations. The resolution of the routing to a single termination is performed by the SSCP, preferably based on a product type that is included with the customer's pre-paid account, and/or based on caller input. Alternately, other routing criteria may also be used to determine the proper routing of a customer service call, including without limitation the geographical location of the caller, time of day, and information stored in the corresponding account record. When the terminating number is determined, the SSCP commands the IP to place a call to the terminating number in operation. In operation 732, the IP outpulses (using DTMF and based on commands from the SSCP) the terminating number, and the call is routed through the switched network to an appropriate CSC.

In operation 734, the CSC ACD (or other switching logic) answers the call. The customer's pre-paid account could be debited at this time, in accordance with the existing art. Preferably, however, in accordance with the present invention, the customer account is not debited until a service agent answers the call. Consequently, the customer is not billed for the time spent on-hold in a queue, even though the call was "answered" by the CSC ACD. Preferably, the call time spent on hold in an ACD queue is charged to the toll-free telephone number, which is typically owned by the vendor.

The ACD determines in operation 736 which service agent or agent group should handle the call and determines whether that agent or an agent in that group is available to take the call. If no such agent is available, processing is routed to operation 738, where the call is placed in a queue. When a qualified agent becomes available, the ACD routes the call to that agent in operation 740.

In operation 742, the selected agent station receives selected data from the customer's pre-paid service account on the SDP and preferably displays the data on a screen to the agent. The data stored in a pre-paid service account can vary widely based on the vendor's requirements. Product information, such as product registration number and product type, can be provisioned in the pre-paid account when the account is first configured and before any calls are accepted. Customer information, such as customer name, geographical location, and service preferences, can be collected by the IP during the call and stored in the SDP. Any of this information can be retrieved by and presented to the agent station in operation 742. Alternately, access restrictions can limit the data accessible by the agent.

In operation 744, the agent answers the call, which was initiated by the IP. It is desirable to refrain from debiting the customer's pre-paid account until the agent actually answers the call from the IP. For example, if a customer is paying for service by the minute, it is preferable that the pre-paid account not be charged while that customer is on hold in the queue. Discussions of FIGS. 9 through 11 address several methods for debiting the pre-paid account after an agent answers the call. As illustrated in FIG. 7, when the SSCP detects the agent's answer in operation 746, it initiates a timer in operation 748 that may be used to debit the customer's pre-paid account (e.g., if the billing mode is on a per minute basis), to assert a maximum call duration for each service call, to maintain service call statistics, or for other purposes.

When the SSCP retrieves the account data in operation 716, the account balance was preferably recorded. As the call and timer proceed from operation 748, the SSCP tracks the remaining account balance based on the timer value in operation 750. If the remaining balance reaches zero, or preferably, if the remaining balance reaches a pre-set threshold (e.g., one minute remaining), the IP interrupts the call and plays an audio message to the customer in operation 752. The audio message notifies the customer that the account balance is at or near zero and asks if the customer wishes to recharge the account. If the customer decides to recharge the account in operation 754, the SSCP and IP direct the customer in operation 756 through the process of recharging the account, for example, by using a credit card, which is known in the art. After the account is recharged, the SSCP updates the pre-paid account on the SDP and the call continues. If no recharge is performed, then the call is terminated in operation 758.

Alternately, the recharge process may also be applied to service billed on a "per incident" basis. For example, at or near the maximum call duration, the customer may be asked by audio responses from the IP whether the customer wishes to continue the call, thereby incurring a new incident charge to the pre-paid account. This process is similar to the recharging process discussed above, and further, may involve the operations of directing the customer through the steps for recharging to add additional incidents to the pre-paid account.

If the call proceeds without depleting the account balance or without reaching an account balance threshold, then the call (i.e., call leg B) ends when either the agent or customer hangs up, determined in operation 760. If the customer hangs up, then the entire call (i.e., call leg A and call leg B) is terminated, and the SSCP updates the pre-paid account on the SDP in operation 762. If the agent hangs up, the SSCP terminates call leg B in operation 764 and causes the IP to play menu options for the customer on call leg A in operation 766. Preferably, the customer is presented at least with the options of continuing or terminating the call. In operation 768, the IP collects the customer's input, and in operation 770, the IP sends the customer input to the SSCP. If the customer chooses to continue the call in operation 772, the call returns to operation 728 and continues as previously discussed. If the customer chooses to terminate the call in operation 772, the SSCP ends the call and updates the account on the SDP in operation 762.

FIG. 8 is a flowchart illustrating the process performed by an exemplary SSCP service card application. The SSCP application is an IVR application that sends commands instructing the IP to play audio messages and to collect caller input. The process begins at start 800, which represents the receipt by the SSCP of a service card call placed to a dialed access number. Operation 802 performs a language check. Different languages are supported with different access numbers (i.e., the application selects the audio message language based on the dialed access number), although an alternate embodiment may employ a menu selection, using voice prompts and DTMF input to determine the proper language for the voice interface. The application prompts the customer for a PIN number in operation 804, which is preferably entered by the customer using DTMF signals. Alternately, the PIN may be swiped into a card reader or input via voice recognition.

The DTMF string entered by the customer is validated in operation 808. If the string is invalid, operation 810 either exits, requires operator assistance, or retries the PIN input procedure by looping back to operation 804, according to time-out or other limiting conditions. If operation 810 results in an "exit" result, call leg A is terminated by the SSCP starting at operation 821. Call termination results in the pre-paid account data being updated with the results of the call (e.g., the account data may be modified to reflect a call attempt), if necessary. If operator assistance is required, processing is transferred to operation 814, which initiates operator assistance on an ISN coupled to the SSCP. Throughout this process, voice status signals are provided to keep the customer apprised of the progress of the call.

If a valid DTMF string is entered, the SSCP accesses the pre-paid account in the SDP using the PIN as a key. The access number may also be used in combination with the PIN to form a key into the database. If the access to the SDP database is unsuccessful using the PIN as the key, or as part of the key, operation 816 determines that the PIN is invalid (i.e., unauthorized). Other circumstances can cause an invalid PIN result, including an expired PIN or a settable parameter in the account that indicates that the PIN is inactive or invalid. If the PIN is invalid, operation 818 either terminates the call or retries (i.e., informs the customer that the entered PIN is invalid and requests that the customer enter a new PIN). If the PIN is valid, operation 820 retrieves and records account data, including the account balance corresponding to the PIN, for later use. Operation 822 determines if the call originates at a payphone, based on the info digits provided with the SS7 Initial Address message. If the call is from a payphone, operation 824 indicates this to toll ticket A. A toll ticket is an application that monitors and maintains information for toll calls. Payphone indication is for some payphone call blocking applications that are used as a result of FCC-mandated surcharges.

Operation 826 determines whether "PIN locking" is enabled. PIN locking is used to prevent multiple users from trying to use the same service card number at the same time. If PIN locking is enabled, operation 828 determines whether the account corresponding to the entered PIN is locked. If the account is locked, then the caller is warned that the account corresponding the PIN is already in use and the application terminates the call.

If PIN locking is not enabled or the PIN account is not locked, then the account or card status is evaluated in operation 830. An "expired" card status results in call termination. A "suspended" call status is further evaluated in operation 838. If the reason for the suspension is "domestic fraud", then an appropriate audio message is played to the caller in operation 840. For any other reason, the caller is notified of the suspension with an alternate audio message in operation 842. In either case, the application then terminates the call.

A "generated" or "active" card status is evaluated in operation 844. The "generated" status corresponds to an account that is created, but not yet set to an "active" status. If the current date is after the expiration date, then the card status is changed to "expired" in operation 846 and the call is terminated. If the current date is not after the expiration date, operation 848 determines whether the card status is set to "active" (as opposed to "generated"). If the card status is set to "active", operation 850 determines is the account balance has reached zero. This operation can also determine if the account balance has reached a preset threshold or been depleted to a negative balance (e.g., if some credit is extended to the customer). If the account balance satisfies these criteria, then processing proceeds to a recharging sub-process (starting at operation 862). Otherwise, processing proceeds to the main menu sub-process at operation 862.

If the determination in operation 848 is that the card status is not "active", then operation 852 determines whether the current date is after the activation date. If not, the caller is informed in operation 861 that the account cannot yet be activated and the call is terminated. Alternately, if the current date is after the activation date, the card status is set to "active" in operation 854. If this call constitutes the first use of the card, as determined in operation 858 preferably using a flag or count set in the account record, operation 856 sets the expiration date in the account data to equal the current date plus a predetermined activation duration. Whether or not the current call is the first use of the card, operation 860 determines evaluates the account balance in a manner similar to operation 850. Processing proceeds therefrom accordingly.

Operation 862 plays an audio message indicating the account balance associated with the PIN. Service card accounts can be configured to provide service from a single terminating number (e.g., a single service center handling all customer calls). Alternately, accounts can be configured to provide services from more than one terminating number (e.g., support for a product from a customer service center, billing support from a financial service center, and account information from a customer service center). Operation 864 determines whether the card has a single terminating number. If the account supports a single terminating number, then operation 865 records the termination number, which is required for call routing, and proceeds to operation 880 to connect the call to the terminating number.

If the account supports multiple terminating numbers, operation 866 plays an audio menu from which the caller may select using DTMF signals or voice responses, which are monitored in operation 868. For example, the illustrated embodiment supports at least six menu options: "account information", "customer service", "operator assistance", "terminating number selection", "recharge", and "exit"; and two exceptions: "time-out", and "invalid selection". The "account information" option is implemented in operation 872, which plays a voice message indicating the expiration date and account balance before returning to the audio menu of operation 866. The "customer service" option is implemented in operation 874, which transfers the caller to a customer service representative. The customer service representative can re-transfer the customer back into the service card system, if necessary. The "operator assistance" option is implemented in operation 876, which transfers the caller to an operator via ISN 310 of FIG. 3. The operator can re-transfer the customer back into the service card system, if necessary. The "terminating number selection" option is implemented in operation 878, which records the selected termination number and proceeds to operation 880 to connect the call to the selected terminating number. The "recharge" option is implemented in operation 833, which allows the caller to increase the balance the pre-paid service card account. The "exit" option allows the caller to terminate the call, which the caller may also accomplish by merely hanging up. If the caller "times-out" or enters an invalid option, operation 870 determines whether to allow the caller to retry the selection or to terminate the call. The foregoing describes a set of preferred menu options and responses, but it should be recognized that other options and responses are contemplated as being within the scope of the present invention. For example, menu options can lead to sub-menus in a hierarchical menu structure. Alternately, a particular option may require a predetermined password to be entered to obtain access to certain features within the service card system.

When a terminating number is recorded (e.g., in operations 865 and 878), operation 880 connects call leg A to the IP. In operation 882, the IP out-pulses the terminating number. Operation 884 determines whether the terminating number is busy or not answering. If so, operation 888 plays an audio message indicating a problem and asking the caller to call again, after which the call is terminated. Alternately, in operation 886, the SSCP detects an answer by an ACD at a CSC and connects call leg B to the IP. Operation 890 starts an on-hold timer, which is used to track the time callers spend on-hold or in a queue. At this time, the application can have the IP connect call leg A with call leg B, which is shown in operation 892. Such an implementation, however, may allow the caller to hear the same audio heard by the service agent when he or she answers the phone. In some systems, the agent may first hear a voice message, such as a voice prompting the agent to enter a DTMF signal to initiate the call or DTMF signals generated by the agent's station. It may not be desirable to allow the caller to hear these signals. Accordingly, an alternate embodiment of the present invention postpones operation 892 until the service agent has initiated the call. Preferably, a pre-recorded customer announcement or music is played on call leg A while the caller is on hold.

In operation 894, the application detects when a service agent answers the call and receives a DTMF tone (e.g., representing a digit) from the ACD in operation 896. If the tone is invalid, exception processing operates to collect a new tone or terminate the call, preferably giving the caller a choice. If the tone is valid, operation 898 stops the on-hold timer, the value of which can be communicated to the service agent and/or recorded in a database for CSC statistics. In operation 801, the SSCP disconnects the IP by releasing both call leg A and call leg B from the IP (thereby freeing up two IP ports) and links the two legs together at the SSCP. In operation 803, the SSCP starts a toll ticket for the leg A, which includes a timer that can be used to monitor the progress of the call against the pre-paid service card account balance or a maximum duration allowed for an incident. In operation 805, the SSCP monitors the call to detect when either party hangs up, when a special DTMF string is entered designation a special function (e.g., when a caller requests an operator or a new call connection), or when another event occurs requiring action by the SSCP. Processing then proceeds depending on the event detected and/or the status of the pre-paid account.

If the event detected is a hang-up by the service agent, operation 807 determines causes processing to proceed to terminate the call if the caller has also hung up. Otherwise, processing proceeds to operation 809, which updates the pre-paid account (maintaining the lock on the account, if enabled). Updating the account preferably employs an INAP message sent to the SDP to update the account with the latest call information, such as the new account balance. Operation 811 causes processing to proceed to a recharging sub-process if the account balance equals 0. Otherwise, processing proceeds to operation 862 via flowchart connector "F". If the SSCP detects that the caller has hung up, the call is terminated in operation 821. If the account balance equals zero, the processing proceeds to allow the caller to recharge the pre-paid account, if desired.

If the SSCP detects that only one minute remains in the pre-paid account (e.g., if billed on a per minute basis) or in the maximum duration limit of a call (e.g., if billed on a per incident basis), then processing proceeds to operation 813. If billing is not on a per incident basis, operation 815 produces an audio warning to tell the caller that only one minute of service remains and then processing proceeds to monitoring operation 805. Otherwise, if billing is on a per incident basis, processing proceeds to operation 817, which determines whether the current incident is the last incident in the account balance. If so, processing proceeds to operation 815, If there are incidents remaining in the account, operation 819 provides an audio message telling the caller that an additional incident will be consumed (in an operation that is not shown) if the call continues for more than one additional minute.

When a call is terminated, processing proceeds to operation 821 via flowchart connector "C". If appropriate, operation 821 plays an audio message explaining the reason for the call termination (e.g., technical difficulties or account balance depleted). Operation 823 causes processing to proceed to operation 831 if the PIN is not known, which may occur for example if the caller failed to input a valid PIN at the beginning of the call. Otherwise, if the PIN is known, processing proceeds to operation 825, which updates the pre-paid service card account. Operation 827 generates an event log, which can store information about the call, such as the call duration and the on-hold duration. Operation 829 unlocks the account that corresponds to the PIN, provided locking is enabled and the account was locked. The SSCP terminates the call in operation 831.

In operation 833 of the recharging sub-process, the customer is requested to provide a credit card number. In an alternate embodiment, other information, such as a credit account number and/or password can also be received to recharge a pre-paid account. In the illustrated embodiment, the format of the credit card number provided is evaluated in operation 835 (e.g., the customer may abort this process without providing a complete credit card number). In operation 839, it is determined whether to retry or exit. In operation 837, the customer is requested to provide an amount to be charged to the credit card and added to the pre-paid account balance. An attempt to retrieve authorization from the credit card company is performed in the operation 841. If the authorization is granted, processing proceeds the main menu at operation 862. Otherwise, the customer may attempt to retry a new credit card entry or exit, as determined in operation 839.

In an exemplary embodiment of the present invention, a pre-paid service card account may be debited once call leg B is connected to the CSC. For example, the triggering can involve starting a timer used to debit the pre-paid account or to limit the maximum duration of a call (when billing is on a per incidence basis). In this implementation, operations 894 and 896 can be skipped and the debiting of the pre-paid account can correspond to a time before a service agent answers. However, because a connection to CSC does not necessarily or immediately result in a connection with a service agent (e.g., a service agent may not yet be available to take the call), it is preferable to avoid debiting the customer's pre-paid account until the caller is actually connected with a service agent. For example, it may be undesirable from a business perspective to charge the customer's pre-paid account for time spent on-hold in a CSC ACD queue. The preferred technique comprises triggering the debiting of pre-paid account when a connection to the service agent is detected.

Figure 9:
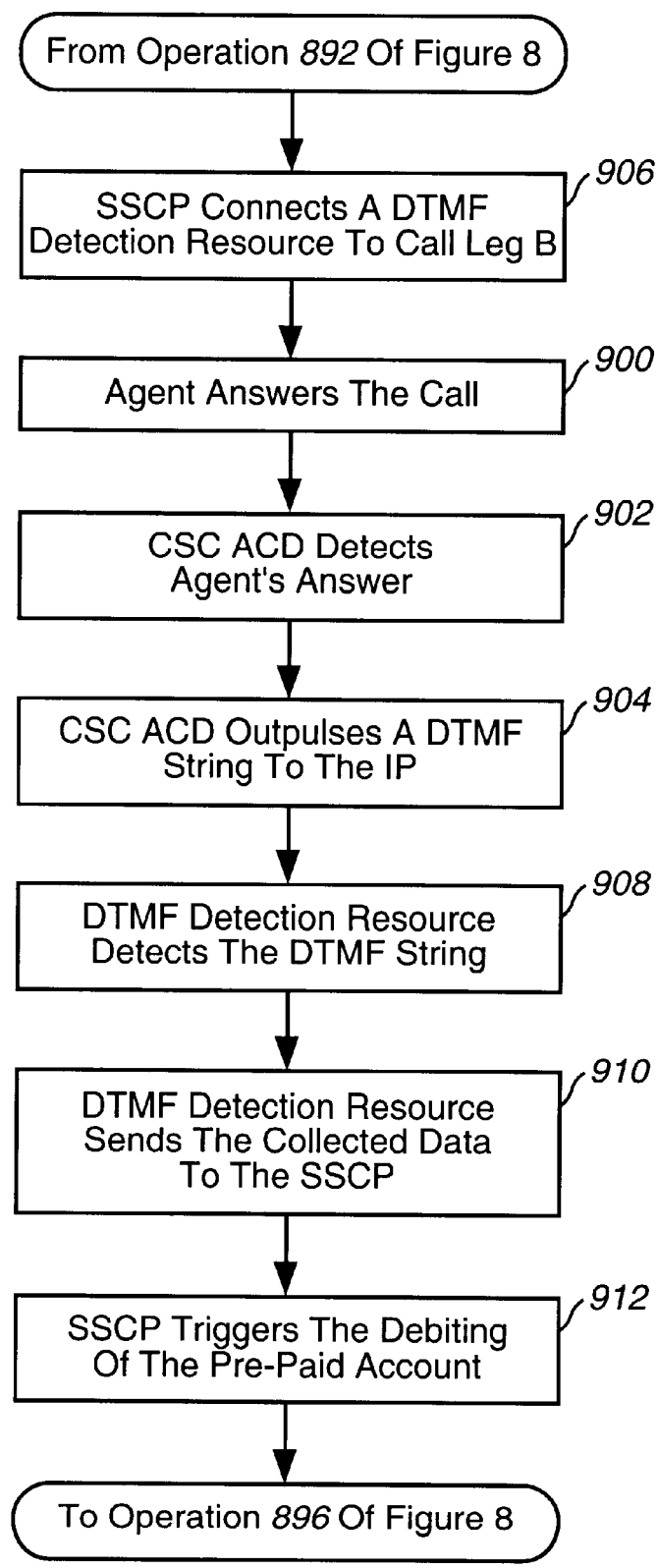
FIG. 9 depicts a detailed flowchart of a first method embodiment for triggering a debit in an pre-paid account in accordance with the present invention.

FIG. 9 illustrates a first exemplary method for triggering the debiting of the pre-paid account after the call is answered by a service agent. In this mode, operations 894 and 896 of FIG. 8 comprise the steps illustrated in FIG. 9. In operation 906, the SSCP connects a DTMF Detection Resource to the call leg B at the IP. When the service agent answers the call in operation 900, the CSC ACD detects the agent's answer in one of at least two ways. First, the ACD can detect the agent's line going "off-hook" using standard telephony switch technology. The ACD is pre-programmed to outpulse a specific DTMF string as a triggering signal on call leg B when it detects agent off-hook. Alternately, the agent station can send a "call answered" message as a triggering signal to the ACD via the CTI server (see CTI server 602 of FIG. 6), which in turn sends a triggering signal the ACD to outpulse the proper DTMF string. In either method, the DTMF string is outpulsed over the voice connection to the IP in operation 904. It is preferable that call legs A and B remain unconnected while the caller is on hold to prevent the caller from hearing the DTMF signal that indicates an agent's answer. The DTMF Detection Resource detects the DTMF string in operation 908 and sends the collected data to the SSCP in operation 910, which triggers the steps necessary for debiting of the pre-paid account in operation 912. For example, the triggering can involve starting a timer used to debit the pre-paid account or to limit the maximum duration of a call (when billing is on a per incidence basis). The DTMF detection preferably includes a multiple tone DTMF string and a comparison of the detected DTMF tones with an expected tone sequence to ensure that the DTMF tones properly indicates the answer of a service agent rather than accidental DTMF tones (e.g., tones entered by the caller while on hold).

Figure 10:
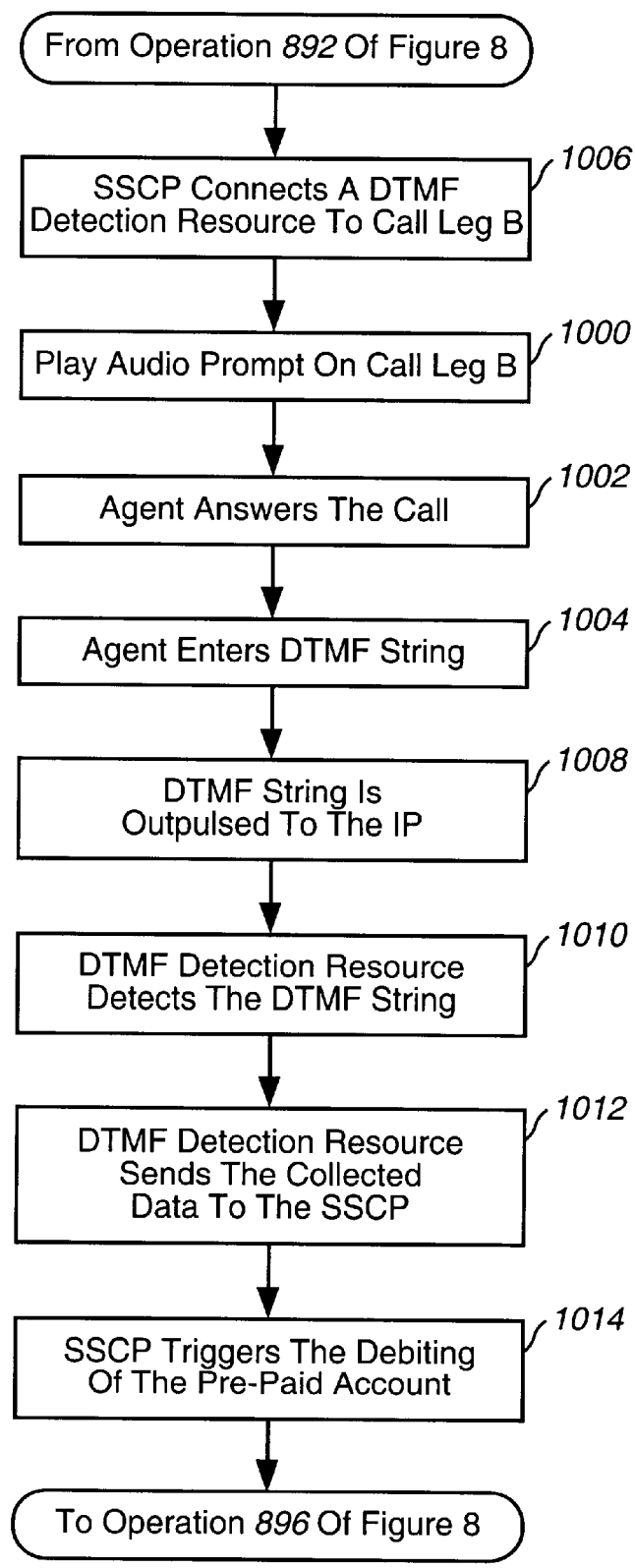
FIG. 10 depicts a detailed flowchart of a second method embodiment for triggering a debit in an pre-paid account in accordance with the present invention.

FIG. 10 illustrates a second exemplary method for triggering the debiting of the pre-paid account after the call is answered by a service agent. In this mode, operations 894 and 896 of FIG. 8 comprise the steps illustrated in FIG. 10. In some systems, the CSC cannot automatically inform the SSCP that a service agent has answered the phone. Instead, the service agent can manually key in a DTMF sequence as a triggering signal to inform the SSCP that he or she has answered the call. In operation 1006, the SSCP connects a DTMF Detection Resource to the call leg B at the IP prior to operation 1000. Preferably, call leg A and call leg B are still connected to individual IP ports. In operation 1000, the IP port connected to call leg B continuously plays an audio message prompting the agent to enter the DTMF string when he or she answers the call. It is preferable that the call legs A and B remain unconnected while the caller is on hold to prevent the caller from hearing the audio prompts and the agent's DTMF signal response. When the agent answers the call in operation 1002, the agent can hear the prompt and enter the DTMF string to indicate that the call is answered in operation 1004. The DTMF string is outpulsed over the voice connection to the IP in operation 1008. The DTMF Detection Resource connected to the IP detects the DTMF string in operation 1010, and sends the collected digits to the SSCP in operation 1012. When the SSCP receives the proper digits, it triggers the steps necessary for debiting of the customer's pre-paid account in operation 1014.

Figure 11:
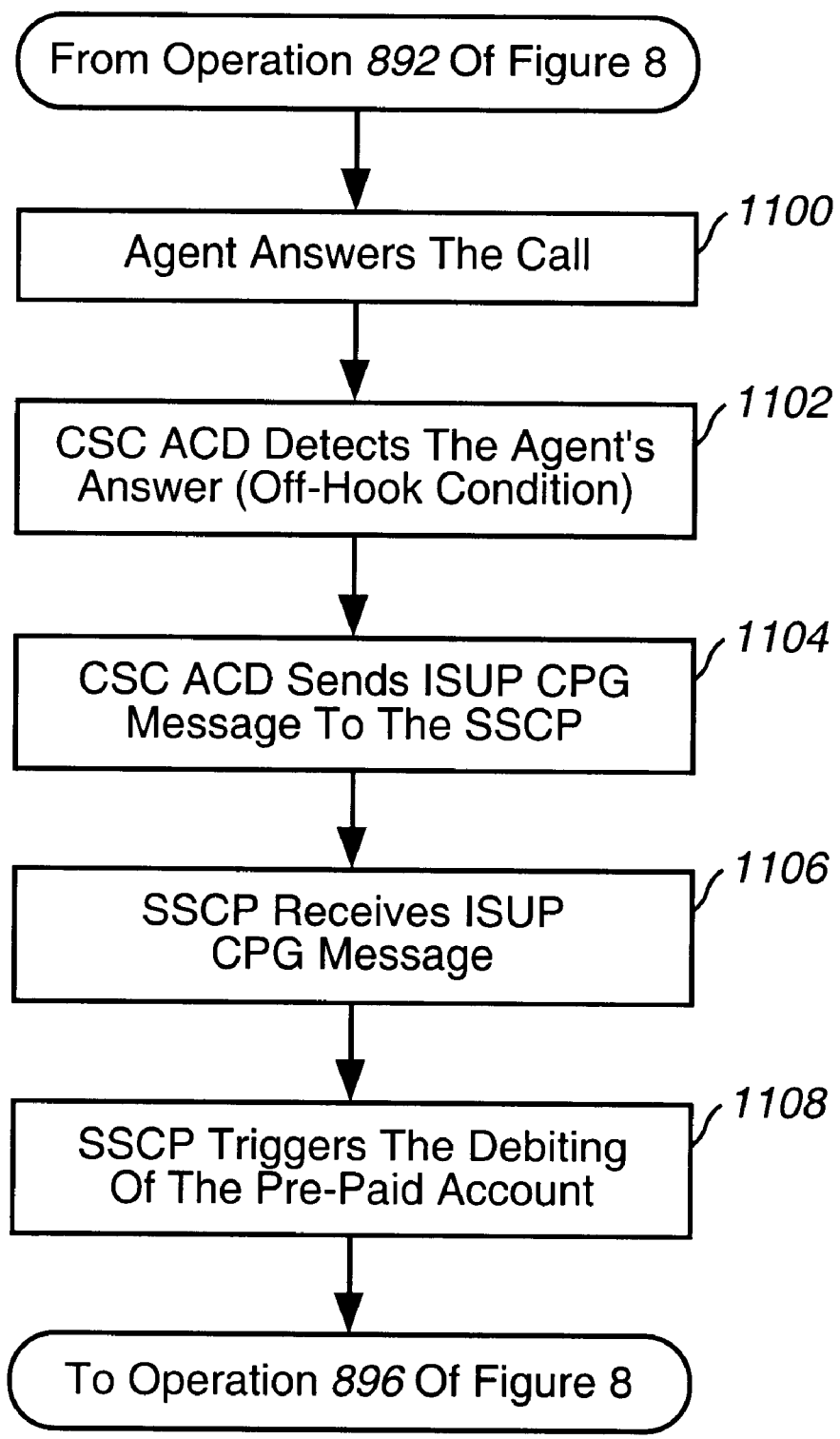
FIG. 11 depicts a detailed flowchart of a third method embodiment for triggering a debit in an pre-paid account in accordance with the present invention.

FIG. 11 illustrates a third exemplary method for triggering the debiting of the pre-paid account after the call is answered by a service agent. In this mode, operations 894 and 896 of FIG. 8 comprise the steps illustrated in FIG. 11. This embodiment employs the SS7 ISUP message as a triggering signal, preferably a Call Progress (CPG) message, to signal the SSCP that the service agent has answered the call. A CPG message is a B-ISDN user part message that is used in the United States. Generally, ISDN User Part (ISUP) provides Integrated Services Digital Network (ISDN) call setup and control and is harmonized to work with ISDN access protocol. The term B-ISDN refers to Broadband ISDN technology. In operation 110, a service agent answers the call. The CSC ACD detects the agent's answer by sensing the off-hook condition. In operation 1104, the ACD sends an ISUP CPG message to the SSCP. The SSCP receives the CPG message in operation 1106 and triggers the debiting of the pre-paid account in operation 1108. This method uses SS7 resources, which are typically already provisioned, and can simplify the service card system resources (e.g., no DTMF detection is required).

In fourth exemplary method for triggering the debiting of the pre-paid account after the call is answered by a service agent, operations 894 and 896 of FIG. 8 comprise steps described below. As shown in FIGS. 3, 4, and 5, the INO SDP (404 of FIG. 4) and the CSC LAN (608 of FIG. 6) may be linked to an Internet Protocol network (320 of FIG. 3), which can provide TCP/IP connectivity between the SDP and the agent stations in the CSC. Moreover, CSC Host Computer (322 of FIG. 3) is also link to the Internet Protocol network 320. A CSC Host Computer is preferably a database system that is owned and operated by the product vendor, such that pre-paid service card accounts can be stored therein instead of in the SDP. The interconnectivity among the CSC Host Computer, the SDP, and the CSC provides many options for configuring the service card system. For example, a logical communication process can be established between an agent station and the SDP, between the agent station to SDP via the CSC Host Computer, between the CTI Server and the SDP, of between the CTI Server to the SDP via the CSC Host Computer. Other logical processes may be implemented using the systems disclosed herein.

In a first configuration of this embodiment, when an agent answers the call, the agent station sends a TCP/IP message as a triggering signal through the Internet Protocol network directly to the SDP. In a second configuration, when the agent answers the call, the CTI Server sends a TCP/IP message as a triggering signal to the SDP via the Internet Protocol Network. In response to either message, the SDP sends an INAP message as a triggering signal to the SSCP to trigger the debiting process (e.g., decrement the number of available incidents or start the call timer).

In a third configuration, the CSC Host Computer is used to store the pre-paid service card accounts. When a call is received by the service card INO, the SDP retrieves the account information in real-time from the CSC Host Computer. When the agent answers the call, the agent station or the CTI Server sends a TCP/IP message as a triggering signal through the Internet Protocol Network to the CSC Host Computer, which in response sends a message as a triggering signal to the SDP to trigger debiting of the account.

Figure 12A:
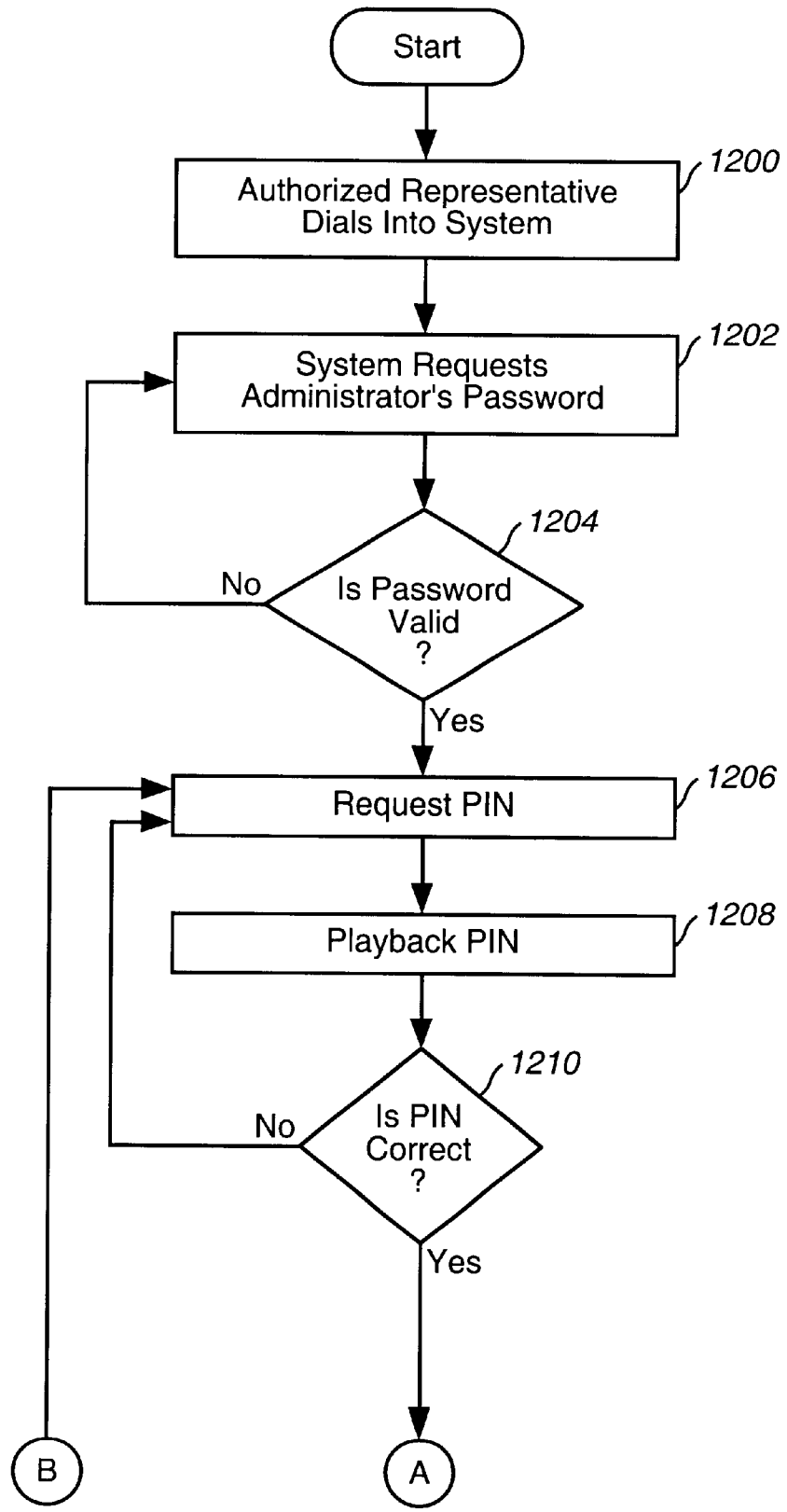
FIG. 12 depicts a flowchart of an administration routine of a support card application in accordance with the present invention.
Figure 12B:
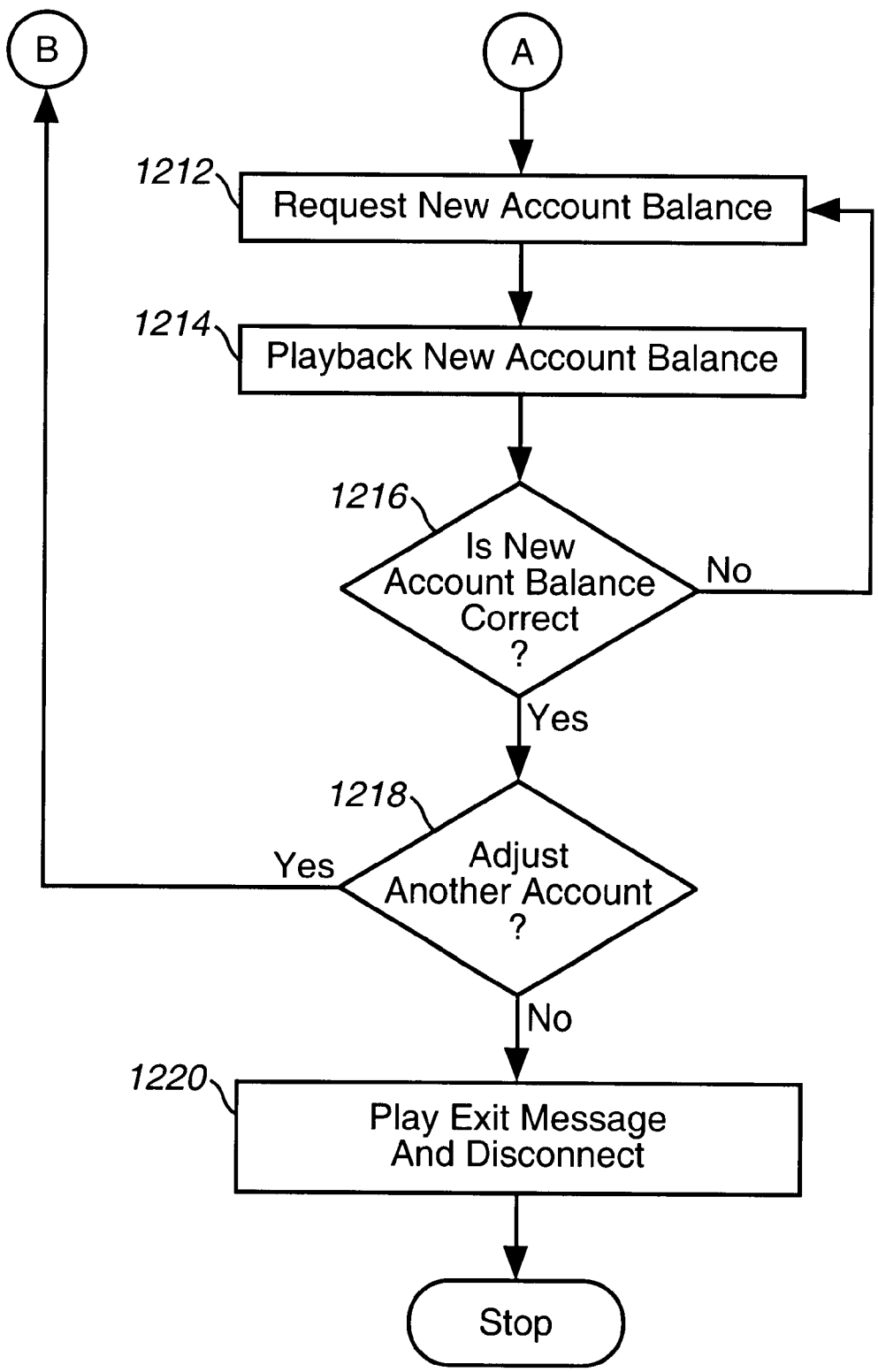

FIG. 12 is a process flow diagram for a administration routine of a service card application. Preferably, the system provides a mechanism for authorized personnel to adjust the account balance (e.g., available service incident count) associated with any PIN. Since the volume of manual adjustments is expected to be low, a password voice application routine executing in the SSCP may be employed to perform these adjustments, thereby avoiding the fixed, ongoing costs associated with direct connections to the customer transaction database. The use of a voice application routine will also avoid security concerns associated with dial-up modem access to production VRUs.

In one embodiment, all adjustments to the account balance are logged to a file for reference. Adjustment of an account balance is initiated by an authorized representative dialing the administration routine's number provided on the service card as indicated in operation 1200. The system will request the administrator's password in operation 1202. Next, the system verifies the password in operation 1204 and if the password is correct, processing proceeds to operation 1206. Otherwise, the system again requests the administration password. Alternately, administration routine can exit or divert to another routine to obtain operator assistance. In one embodiment, for example, after two invalid attempts, the system disconnects.

If the administration password is correct, however, the system requests the PIN associated with the account to be modified (operation 1206). In operation 1208, the system prompts the authorized representative with the PIN number supplied, and in operation 1208, the authorized representative is prompted to verify that the supplied PIN was entered correctly. If the PIN was entered incorrectly, the system returns to operation 1206 to allow the authorized representative to re-enter a PIN. Likewise, if no account corresponds to the PIN, the system plays a message indicating that the PIN is invalid and returns to operation 1206. Otherwise, if the supplied PIN was entered correctly the process proceeds to operation 1212. After a predetermined number of invalid attempts or at the caller's direction, the system disconnects or diverts to other processing.

In operation 1212, a prompt is provided informing the authorized representative of the existing account balance corresponding to the specified PIN and requesting the new account balance to be entered. In one embodiment, the system plays the following prompt:

The PIN currently has <plays incident count> of incidents remaining. Please enter the new incident count. Remember that this is the total number of incidents remaining after this adjustment. When finished press the pound key. If you do not wish to adjust the incidents, press only the pound key.

Preferably, the incident count is range limited between 0 and 999 representing new incident count, not the incremental number of incidents. In a similar matter, other account balance units (such as minutes) can be modified by an authorized representative. As shown, in operations 1212 and 1214, the system replays the new account balance and confirms it with the caller. If the caller does not confirm the new account balance, processing proceeds to operation 1212 to allow a new balance to be entered. After a predetermined number of invalid attempts or at the caller's direction, the system disconnects or diverts to other processing.

Once the new account balance is entered correctly, the system prompts the authorized representative in operation 1218 as to whether another account is to be adjusted. If the authorized representative wishes to adjust another account, then the system returns to operation 1206 and requests a new PIN. If the authorized representative does not request to adjust another account, the system plays a message instructing that the process is over and the system disconnects in operation 1220.

A pre-paid service card account is stored in a database, recorded in storage medium linked to an SDP or CSC Host Computer. An exemplary embodiment of a pre-paid account data table in accordance with the present invention is illustrated in FIGS. 13A, 13B, and 13C. Data elements access_num, pin_code, and track_no represent key data used to access the account database. One or more of these fields can be used, individually or in combination, to locate the account data for a particular account or set of accounts.

The remaining data elements are non-key elements in a preferred embodiment of the data table, although each element could be used as a key element within the scope of this invention. Activation_date is a yyyymmdd_formatted element specifying the beginning of the allowable activation period for the account. Activation_duration specifies the number of months of activation and can be set to zero for accounts having no activation duration limit. Activation_status_type is a 16-bit data element including a Card Status code (i.e., account status), a Card Suspension Reason code (e.g., used in operation 838 of FIG. 8), a Card Type code, and a First Use flag (e.g., as used in operation 858). Balance specifies the current account balance. These and other data elements are described in detail in FIGS. 13A, 13B, and 13C.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Moreover, while there have been described herein the principles of the present invention in conjunction with specific system and method implementations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. For example, the present invention not limited to implementation in a customer support card system. Such alternate embodiments may include without limitation to implementations for news and sport update services, insurance coverage, medical treatments, travel accommodations, travel incentives (e.g., frequent flier programs), automobile warranty and maintenance records, direct mail order databases. Furthermore, the customer call can alternately be in the form of a digital communications connection, such as by dial-in modem, Internet/Intranet/Extranet link, or digital cable connection. In this configuration, for example, on-line services may be accessed using a personal computer linked into the service card network in accordance with a pre-paid service account.

Although claims have been formulated in this application to particular combinations of features, it should be understood that the scope of the disclosure herein also includes any novel feature or any novel combination of features disclosed either explicitly or implicitly for any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived thereof.

What is claimed is:

1. A system for automating the routing of a customer call for a service and the debiting of pre-paid accounts in payment for said service, said system comprising:
    a customer service network;
    a customer transaction database coupled to said customer service network for storing an account record;
    a transaction processor coupled to said customer transaction database and configured to process said customer call received through said customer service network and to route said customer call to an appropriate service center in accordance with criteria relating to data recorded in said account record;
    an agent station located at said appropriate service center and coupled to said transaction processor to receive said customer call; and
    a triggering signal to trigger a debit in said account record after an answer is detected at said agent station.

2. The system according to claim 1 wherein said means for triggering a debit comprises a DTMF detection resource connected to said customer call and coupled to said transaction processor for detecting a DTMF signal that indicates an answer by a service agent.

3. The system according to claim 2 wherein said means for triggering a debit further comprises:
    a message sent by said agent station; and
    switching logic that receives said message and sends said DTMF signal to said DTMF detection resource.

4. The system according to claim 1 wherein said means for triggering a debit comprises an internet protocol network coupling said transaction processor and said agent station for communicating a message indicating that said customer call was answered at said agent station.

5. A system for accepting a call from a customer for a service relating to a product, customer or vendor and directing said call to an appropriate service center, said system comprising:
    a customer service network;
    a customer transaction database coupled to said customer service network for storing an account record; and
    a transaction processor coupled to said customer transaction database and configured to process said customer call received through said customer service network and to route said customer call to said appropriate service center in accordance with criteria relating to data recorded in said account record, wherein an agent station located at said appropriate service center and coupled to said transaction processor receives said customer call and said transaction processor triggers a debit in said account record after an answer is detected at said agent station.

6. The system according to claim 5 further comprising an Interactive Voice Recognition application that receives said call from said customer and converts audio signals from said call into data signals.

7. The system according to claim 5 wherein said transaction processor is configured to receive a customer identification number from said customer during said call and to authorize said service for said customer in accordance with an account status recorded in said account record.

8. The system according to claim 5 wherein said transaction processor is configured to receive a customer identification number from said customer during said call and to authorize said service for said customer in accordance with an account balance recorded in said account record.

9. The system according to claim 5 wherein said customer service network is call accessible with a dedicated toll-free number.

10. The system according to claim 5 wherein said account record comprises at least one of product data, vendor data, and customer data.

11. The system according to claim 5 wherein said transaction processor is configured to limit an amount of said service authorized for said customer in accordance with data stored in said account record.

12. The system according to claim 5 wherein said account record comprises an account balance data element defining a limit on said service authorized for said customer, said transaction processor being configured to terminate said call when an amount of said service reaches said limit.

13. The system according to claim 12 wherein said account balance represents a total amount of service time authorized for said customer.

14. The system according to claim 12 wherein said account balance represents a total number of service incidents authorized for said customer.

15. The system according to claim 5 further comprising an agent station at which data recorded from said account record is presented to a service agent prior to said call being answered by said service agent.

16. The system according to claim 5 wherein said appropriate service center is coupled to said transaction processor, and further comprising:
a first call leg established between said customer and said transaction processor; and
a second call leg established between said transaction processor and said service center, said first and second call legs being maintained separately until an answer is detected on said second call leg.

17. The system according to claim 16 wherein said detected answer is caused by a service agent.

18. The system according to claim 16 wherein said detected answer is caused by an automated call distribution application.

19. The system according to claim 5 wherein said transaction processor comprises an intelligent network overlay including an intelligent peripheral, a service switching and service control point, and a service data point.

20. The system according to claim 5 further comprising an intelligent services network coupled to said customer support network for providing operator assistance.

21. The system according to claim 20 wherein said intelligent services network comprises a link to said customer transaction database for recharging an account balance of said account record.

22. The system according to claim 5 wherein said appropriate service center includes an automated call distribution application coupled to said transaction processor, and further comprising an internet protocol network coupling said appropriate service center to said customer transaction database.

23. The system according to claim 22 further comprising a host computer system coupled to said internet protocol network for storing said customer transaction database.

24. A system for triggering a debit in a pre-paid account in payment for a service relating to a call between a customer and a service agent, said system comprising:
a call service center including an agent station;
a customer transaction database coupled to said call service center for storing an account record associated with said customer; and
a transaction processor coupled to said customer transaction database that receives said call from said customer and forwards said call to said call service center, said transaction processor being configured to debit said account record after said call is answered at said agent station.

25. The system according to claim 24 further comprising an administration application executing on said transaction processor for allowing an authorized representative to modify said account record.

26. The system according to claim 25 further comprising a password verification routine executing on said transaction processor for verifying authorization of said authorized representative.

27. The system according to claim 24 further comprising:
switching logic for detecting an answer of said call at said agent station and sending a DTMF pulse to said transaction processor; and
a DTMF detection resource connected to said call by said transaction processor that detects said DTMF pulse sent by said switching logic and triggers said transaction processor to debit said account record.

28. The system according to claim 27 wherein said switching logic is an automated call distribution system.

29. The system according to claim 24 further comprising:
a message sent by said agent station to indicate an answer of said call at said agent station;
switching logic for receiving said message from said agent station and sending a DTMF pulse to said transaction processor; and
a DTMF detection resource connected to said call by said transaction processor that detects said DTMF pulse sent by said switching logic and triggers said transaction processor to debit said account record.

30. The system according to claim 29 wherein said switching logic is an automated call distribution system.

31. The system according to claim 24 further comprising:
a prompt provided by said transaction processor to said agent station for instructing a service agent to enter a DTMF pulse to be forwarded to said transaction processor;
a DTMF detection resource connected to said call by said transaction processor that detects said DTMF pulse entered by said service agent and triggers said transaction processor to debit said account record.

32. The system according to claim 24 further comprising switching logic for detecting said answer of said call at said agent station and sending a message to said transaction processor for debiting said account record upon receipt of said message.

33. The system according to claim 32 wherein said switching logic is an automated call distribution system.

34. The system according to claim 24 further comprising:
an internet protocol network coupling said transaction processor and said call service center; and
a message sent across said internet protocol network indicating that said call was answered at said agent station.

35. The system according to claim 34 wherein said transaction processor includes said customer transaction database and said agent station is configured to send said message to said transaction processor.

36. The system according to claim 34 wherein said transaction processor includes said customer transaction database, and further comprising a computer/telephony integration server coupled to said agent station for detecting that said call was answered at said agent station, said computer/telephony integration server being configured to send said message to said transaction processor.

37. The system according to claim 34 further comprising a host computer system coupled to said internet protocol network for storing said customer transaction database, said transaction processor being configured to query said host computer system for said account record and said agent station being configured to send said message to said transaction processor through said host computer system.

38. The system according to claim 34 further comprising:
a host computer system coupled to said internet protocol network for storing said customer transaction database, said transaction processor being configured to query said host computer system for said account record; and
a computer/telephony integration server coupled to said agent station for detecting that said call was answered at said agent station and for sending said message to said transaction processor through said host computer system.

39. A method of routing a call from a customer for a service and debiting a pre-paid account record in payment for said service, said method comprising:

receiving said call and a customer identification number;

using said customer identification number to locate said pre-paid account record in a customer transaction database;

routing said call to an appropriate service center in accordance with data contained in said pre-paid account record;

detecting an answer of said routed call by a service agent; and debiting an account balance in said pre-paid account record, responsive to said operation of detecting an answer.

40. A method of routing a call from a customer for a service, said method comprising:

receiving said customer call and a customer identification number;

using said customer identification number to locate an account record in a customer transaction database;

routing said customer call to an appropriate service center in accordance with data contained in said account record, wherein an agent station located at said appropriate service center and coupled to a transaction processor receives said customer call and said transaction processor triggers a debit in said account record after an answer is detected at said agent station.

41. The method of claim 40 further comprising presenting information from said account record to said service agent about at least one of a customer, a product, and a vendor.

42. A method for debiting an account record in payment for a service relating to a call between a customer and a service agent, said method comprising:

receiving said call and a customer identification number;

using said customer identification number to locate an account record in a customer transaction database;

detecting an answer of said routed call by a service agent; and debiting an account balance in said account record, responsive to said operation of detecting an answer.

43. The method of claim 42 wherein said call has a duration, and further comprising the operation of limiting said duration of said call in accordance with said account balance.

44. The method of claim 43 wherein the operation of limiting said duration of said call comprises:

prompting said customer with a recharge instruction if said account balance is substantially depleted;

receiving information from said customer to recharge said account; and modifying said account balance in accordance with said received information.

45. The method of claim 43 wherein the operation of limiting said duration of said call comprises terminating said call if said account balance is depleted.

46. A program storage medium, readable by a computer, tangibly embodying a program of instructions executable by said computer for routing a call from a customer for a service and triggering a debit in an account record in payment for said service, the program comprising instructions for:

receiving said call and a customer identification number;

using said customer identification number to locate said account record in a customer transaction database;

routing said call to an appropriate service center in accordance with data contained in said account record;

detecting an answer of said routed call by a service agent; and triggering a debit in an account balance in said account record, responsive to said operation of detecting an answer.

47. A program storage device, readable by a computer, tangible embodying a program of instructions executable by said computer for routing a call from a customer for a service, the program comprising instructions for:

receiving said customer call and a customer identification number;

using said customer identification number to locate an account record in a customer transaction database; and routing said customer call to an appropriate service center in accordance with data contained in said account record, wherein an agent station located at said appropriate service center and coupled to a transaction processor receives said customer call and said transaction processor triggers a debit in said account record after an answer is detected at said agent station.

48. A program storage medium, readable by a computer, tangibly embodying a program of instructions executable by said computer for triggering a debit in an account record in payment for a service relating to a call between a customer and a service agent, the program comprising instructions for:

receiving said call and a customer identification number;

using said customer identification number to locate said account record in a customer transaction database;

detecting an answer of said routed call by a service agent; and triggering a debit in an account balance in said account record, responsive to said operation of detecting an answer.

* * * * *